(12) United States Patent
Zhang et al.

(10) Patent No.: US 11,790,498 B1
(45) Date of Patent: Oct. 17, 2023

(54) AUGMENTED REALITY LOCAL TONE MAPPING FOR LIGHT-TRANSMISSIVE DISPLAY PANEL SYSTEMS AND METHODS

(71) Applicant: Apple Inc., Cupertino, CA (US)

(72) Inventors: Sheng Zhang, San Jose, CA (US); Mahnaz Mohammadi, San Jose, CA (US); Shuang Wang, Palo Alto, CA (US); José Antonio Dominguez-Caballero, San Jose, CA (US); Chaohao Wang, Sunnyvale, CA (US); Tobias Jung, San Francisco, CA (US); Jun Miao, San Jose, CA (US)

(73) Assignee: Apple Inc., Cupertino, CA (US)

( * ) Notice: Subject to any disclaimer, the term of this patent is extended or adjusted under 35 U.S.C. 154(b) by 139 days.

(21) Appl. No.: 17/003,645

(22) Filed: Aug. 26, 2020

Related U.S. Application Data

(60) Provisional application No. 62/898,523, filed on Sep. 10, 2019.

(51) Int. Cl.
*G06T 5/00* (2006.01)
*G09G 5/14* (2006.01)
(Continued)

(52) U.S. Cl.
CPC .............. *G06T 5/009* (2013.01); *B60K 35/00* (2013.01); *G02B 27/0101* (2013.01); *G02B 27/0172* (2013.01); *G06T 5/20* (2013.01); *G06T 5/40* (2013.01); *G09G 5/14* (2013.01); *G09G 5/38* (2013.01); *B60K 2370/1529* (2019.05); *B60K 2370/177* (2019.05); *B60K 2370/25* (2019.05); *B60K 2370/334* (2019.05); *B60K 2370/52* (2019.05); *B60K 2370/785* (2019.05); *G02B 2027/014* (2013.01);
(Continued)

(58) Field of Classification Search
CPC .. G06T 5/009; G06T 5/20; G06T 5/40; G09G 5/14; G09G 5/38
See application file for complete search history.

(56) References Cited

U.S. PATENT DOCUMENTS

2013/0002698 A1\* 1/2013 Geiger .................... G06T 15/00
345/589
2016/0366392 A1\* 12/2016 Raghoebardajal ... H04N 19/167
(Continued)

FOREIGN PATENT DOCUMENTS

RU             187621 U1 \*   3/2019

*Primary Examiner* — Grace Q Li
(74) *Attorney, Agent, or Firm* — Fletcher Yoder, P.C.

(57) ABSTRACT

Systems and methods are provided for displaying augmented reality image content perceived as being overlaid on background image content viewed through a light-transmissive viewing surface. Image processing circuitry may receive input augmented reality image data corresponding with a pixel position on the display panel, determine a perceived background brightness metric indicative of background brightness level at the pixel position based at least in part on captured background image data and an ambient lighting metric, determine a target tone mapping based at least in part on the perceived background brightness metric, and determine display augmented reality image data to be used by a display panel to display the augmented reality image content least in part by applying the target tone mapping to the input augmented reality image data.

19 Claims, 11 Drawing Sheets

(51) Int. Cl.
*G06T 5/40* (2006.01)
*G06T 5/20* (2006.01)
*G09G 5/38* (2006.01)
*G02B 27/01* (2006.01)
*B60K 35/00* (2006.01)

(52) U.S. Cl.
CPC ............... *G02B 2027/0118* (2013.01); *G02B 2027/0138* (2013.01); *G09G 2320/066* (2013.01); *G09G 2360/144* (2013.01); *G09G 2380/10* (2013.01)

(56) References Cited

U.S. PATENT DOCUMENTS

| | | | |
|---|---|---|---|
| 2017/0323615 A1* | 11/2017 | Hazra | G09G 3/002 |
| 2019/0019277 A1* | 1/2019 | Chen | H04N 7/0117 |
| 2020/0169725 A1* | 5/2020 | Hua | G02B 27/0172 |
| 2020/0329222 A1* | 10/2020 | Park | H04N 1/6063 |
| 2021/0165220 A1* | 6/2021 | Nakada | G06T 7/70 |

* cited by examiner

AUGMENTED REALITY LOCAL TONE MAPPING FOR LIGHT-TRANSMISSIVE DISPLAY PANEL SYSTEMS AND METHODS

CROSS-REFERENCE TO RELATED APPLICATIONS

This application claims priority to and the benefit of U.S. Provisional Application No. 62/898,523, filed Sep. 10, 2019, and entitled, "AUGMENTED REALITY LOCAL TONE MAPPING FOR LIGHT-TRANSMISSIVE DISPLAY PANEL SYSTEMS AND METHODS," which is incorporated herein by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to display panels (e.g., electronic displays), which may be implemented and/or operated to display one or more images (e.g., image frames and/or pictures) to present visual representations of information. Accordingly, electronic systems (e.g., devices), such as computers, mobile phones, portable media devices, tablets, televisions, virtual-reality headsets, and vehicle dashboards, among many others, often include and/or utilize one or more display panels. In any case, a display panel may generally display an image by actively controlling light emission from its display pixels, which each includes one or more color component sub-pixels, based at least in part on image data indicative of target luminance (e.g., brightness level and/or grayscale level) of the display pixels in a corresponding image. For example, based on corresponding image data, a display panel may display augmented reality (e.g., virtual) image content overlaid on background (e.g., real) image content, thereby providing an augmented reality (AR) experience.

To facilitate providing an augmented reality experience, in some instances, a display panel may be implemented and/or operated to actively display (e.g., reproduce) background image content, for example, by controlling light emission from its display pixels based at least in part on corresponding image data generated by an image sensor, such as a camera. In other instances, a display panel may be implemented (e.g., deployed) on a light-transmissive viewing surface, such as a lens of a wearable (e.g., headset) electronic device, a windshield of an automotive vehicle, and/or the like. In such instances, the light-transmissive viewing surface may enable environmental light to pass therethrough, thereby enabling a user (e.g., wearer, driver, rider, or operator) to visually perceive background image content. Thus, in such instances, the display panel may facilitate providing an augmented reality experience by displaying augmented reality image content anchored to one or more specific locations in background image content without actively displaying (e.g., reproducing) the background image content.

However, at least in some instances, perception of augmented reality image content may be dependent on optical characteristics, such as color and/or brightness, of background image content on which the augmented reality image content is overlaid (e.g., displayed and/or presented). For example, displaying augmented reality image content overlaid on brighter (e.g., higher luma value) background image content may reduce perceived contrast in the augmented reality image content, thereby resulting in the augmented reality image content appearing washed out compared to displaying the augmented reality image content overlaid on darker (e.g., lower luma value) background image content. In other words, at least in some instances, optical (e.g., visual) characteristics of background image content may affect perceived quality of augmented reality image content overlaid thereon and, thus, perceived quality of an electronic system providing the augmented reality experience.

Accordingly, to facilitate improving augmented reality experience, the present disclosure describes techniques for implementing and/or operating an electronic system, which includes one or more display panels each implemented (e.g., deployed) on a light-transmissive viewing surface, to adaptively adjust presentation (e.g., display) of augmented reality image content based at least in part on expected optical (e.g., visual) characteristics of background image content on which the augmented reality image content is to be overlaid. To facilitate determining the expected optical characteristics of background image content, in some embodiments, the electronic system may include one or more optical sensors. In particular, the optical sensors may include one or more ambient light sensors, for example, implemented and/or operated to determine (e.g., generate and/or output) an ambient lighting metric indicative of an average (e.g., mean) brightness level (e.g., luma value) of background (e.g., environmental and/or ambient) light.

Additionally, the optical sensors may include one or more image sensors, such as a camera, implemented and/or operated to capture frames of background image content. To capture a frame of background image content, in some embodiments, an image sensor may determine (e.g., sense and/or measure) optical characteristics, such as color and/or brightness level, at specific locations (e.g., points) in the frame, for example, which each corresponds with a pixel position at which a display pixel is implemented on a display panel. The image sensor may determine (e.g., generate and/or output) background image data to indicate the sensed optical characteristics of the background image content. In some embodiments, the image sensor may capture background image content at a specific location by determining captured background image data in color component domains, which may be converted to a luma domain before subsequent processing. For example, a red component brightness (e.g., grayscale) level indicated in the captured background image data, a blue component grayscale level indicated in the captured background image data, and a green component grayscale level indicated in the captured background image data may be weighted (e.g., using coefficients) and combined (e.g., summed together) to determine a luma value indicative of achromatic brightness level at the specific location in the background image content.

To facilitate adaptively adjusting presentation of augmented reality image content, in some embodiments, the electronic system may include image processing circuitry implemented and/or operated to process (e.g., adjust) augmented reality image data before corresponding augmented reality image content is displayed. In particular, in some embodiments, the image processing circuitry may receive source augmented reality image data from an image source, process the source augmented reality image data to determine augmented reality display image data that accounts (e.g., compensates) for expected optical characteristics of background image content, and output the augmented reality display image data to enable a display panel to present (e.g., display) corresponding augmented reality image content using the augmented reality display (e.g., processed and/or compensated) image data, for example, instead of using the source augmented reality image data. To facilitate accounting for expected optical characteristics of background image content, in some embodiments, the image processing circuitry may include a background analysis block (e.g., circuitry group) and a tone mapping block (e.g., circuitry group).

In particular, in some embodiments, a background analysis block in the image processing circuitry may be implemented and/or operated to determine one or more perceived background brightness metrics, which are each indicative of a background brightness level expected to be perceived by a user's eye at a specific location in a frame of background image content. Thus, in some embodiments, the background analysis block may determine a perceived background brightness metric associated with a specific location in background image content and, thus, a corresponding pixel position on a display panel based at least in part on corresponding background image data and an ambient lighting metric, for example, in addition to a tint strength applied on a corresponding light-transmissive viewing surface while the display panel is presenting augmented reality image content and/or a target transparency (e.g., opacity) of the augmented reality image content. However, in some embodiments, an image sensor (e.g., camera) of an electronic system that captures background image data may be spatially offset from a user's eye and, thus, captured background image content may differ from the background image content that will actually be perceived by the user's eye via a light-transmissive viewing surface of the electronic system. Accordingly, to facilitate determining a perceived background brightness metric, in some embodiments, the image processing circuitry may process captured background image data to re-project corresponding background image content from the perspective of the image sensor to the expected perspective of the user's eye.

In some embodiments, a tone mapping block in the image processing circuitry may process input (e.g., source) augmented reality image data by tone mapping the input augmented reality image data based at least in part on an associated set of operational parameters, which includes a perceived background brightness metric associated with background image content on which corresponding augmented reality image content is to be overlaid, for example, in addition to target transparency of the augmented reality image content and/or a histogram of brightness levels (e.g., luma values) in preceding (e.g., directly previous frame) augmented reality image content. To facilitate improving perceived quality of augmented reality image content, in some embodiments, the tone mapping block may apply different tone mappings under different sets of operational parameters. For example, the tone mapping block may apply a stronger tone mapping to input augmented reality image data to boost contrast of corresponding augmented reality when the augmented reality image content is to be displayed on brighter background image content compared to when the augmented reality image content is to be displayed on darker background image content. In other words, in some embodiments, the tone mapping block may apply a stronger tone mapping to input augmented reality image content associated with a set of operational parameters including a higher (e.g., larger and/or brighter) perceived background brightness metric compared to the tone mapping applied to input augmented reality image content associated with a set of operational parameters including a lower (e.g., smaller and/or darker) perceived background brightness metric.

As another example, the tone mapping block may additionally or alternatively apply a stronger tone mapping to input augmented reality image data to boost contrast of corresponding augmented reality when directly preceding augmented reality image content is darker while applying a weaker tone mapping to the input augmented reality image data when the directly preceding augmented reality image content is brighter. In other words, in some embodiments, the tone mapping block may additionally or alternatively apply a stronger tone mapping to input augmented reality image data associated with a set of operational parameters including a previous augmented reality content histogram that is skewed brighter and a weaker tone mapping to input augmented reality image data associated with a set of operational parameters including a previous augmented reality content histogram that is skewed darker. As a further example, the tone mapping block may additionally or alternatively apply a stronger tone mapping to input augmented reality image data associated with a set of operational parameters indicative of a lower target transparency while applying a weaker tone mapping to input augmented reality image data associated with a set of operational parameters indicative of a higher target transparency.

To facilitate tone mapping, in some embodiments, the tone mapping block may include and/or utilize one or more tone map look-up-tables (LUTs). In particular, a tone map look-up-table may be implemented to map a color component (e.g., red, green, or blue) brightness (e.g., grayscale) level indicated in augmented reality input image data to a corresponding color component brightness level indicated in output (e.g., display) augmented reality image data, for example, which is supplied to downstream image processing circuitry for further processing and/or a display panel to enable the display panel to display corresponding augmented reality image content.

To facilitate adaptively adjusting tone mapping applied to augmented reality image content, in some embodiments, the tone mapping block may include and/or utilize (e.g., consider) multiple different candidate tone map look-up-tables, for example, each corresponding with a different set of operational parameters. In particular, to facilitate tone mapping input augmented reality image data, in such embodiments, the tone mapping block may determine (e.g., receive) a set of operational parameters associated with the input augmented reality image data and, thus, corresponding augmented reality image content. Additionally, the tone mapping block may select a candidate tone map look-up-table corresponding with the set of operational parameters associated with the augmented reality image content as a target tone map look-up-table and apply the target tone map look-up-table to the input augmented reality image data to determine corresponding output augmented reality image data.

However, at least in some instances, perceived brightness of background image content may vary over an image frame. In fact, at least in some instances, capturing different portions of background image content, which are or would be perceived by a user as having approximately (e.g., substantially) the same optical characteristics, may nevertheless result in captured background image data indicating different background brightness levels and, thus, different perceived background brightness metrics being determined, for example, due to the background image content including real world and/or natural content. In other words, at least in some instances, determining perceived background brightness metrics directly using captured background image data or even re-projected background image data may result in each pixel position being associated with a different set of operational parameters and, thus, different tone mappings (e.g., target tone map look-up-tables) being applied.

To facilitate improving operational and/or computational efficiency, in some embodiments, an electronic system (e.g., image processing circuitry and/or background analysis block) may determine a local tone map grid, which includes one or more grid zones (e.g., regions). As will be described in more detail below, a grid zone in a local tone map grid corresponding with an image frame may group together adjacent pixel positions in an active region of a display panel that will be used to display augmented reality image content overlaid on background image content having approximately (e.g., substantially) the same optical characteristics. To facilitate identifying background image content with approximately the same optical characteristics, in some embodiments, the electronic system may filter re-projected background image data. For example, image processing circuitry implemented in the electronic system may low pass filter the re-projected background image data to determine filtered background image data, which, at least in some instances, may reduce the number of different background brightness level compared to the re-projected background image data.

In other words, compared to corresponding re-projected background image data, filtered background image data corresponding with a frame of background image content may increase likelihood that adjacent pixel positions, which are associated with approximately the same background optical characteristics, are identified as having the same background brightness level (e.g., luma value). Merely as an illustrative non-limiting example, first re-projected background image data associated with a first pixel position may indicate a first brightness level of sixty-five whereas second re-projected background image data associated with a second (e.g., different) pixel position, which is adjacent the first pixel position, may indicate a second brightness level of sixty-six. However, low pass filtering the first re-projected background image data and the second re-projected background image data may result in first filtered background image data corresponding with the first pixel position and second filtered background image data corresponding with the second pixel position indicating the same filtered background brightness level (e.g., luma value). In other words, at least in some instances, filtering re-projected background image data may result in captured background brightness levels being rounded to a coarser granularity, which, at least in some instances, may facilitate reducing the number of different operational parameter sets associated with the active area and, thus, the number of different tone mapping to be applied in a frame of augmented reality image content.

As such, in some embodiments, an electronic system (e.g., image processing circuitry and/or background analysis block) may determine a local tone map grid for a frame based at least in part on analysis of filtered background image data corresponding with background image content over which an active region of a display panel is expected to display augmented reality image content. In particular, the electronic system may analyze the filtered background image data to identify one or more grid zones in the active region that each groups together adjacent pixel positions associated with the same filtered background brightness level. To help illustrate, continuing with the above example, the electronic system may include the first pixel position and the second pixel position, which is adjacent the first pixel position, in the same grid zone of the local tone map grid due to a first filtered background brightness level indicated in the first filtered background image data matching a second filtered background brightness level indicated in the second background filtered image data.

In other words, since an ambient lighting metric is indicative of average background brightness level, pixel positions in the same grid zone may be associated with the same perceived background brightness metric. In fact, in some embodiments, each pixel position in a grid zone may be associated with the same set of operational parameters. In other words, in some such embodiments, a tone mapping block may apply the same tone mapping (e.g., target tone map look-up-table) to input augmented reality image data corresponding with each pixel position in a grid zone, for example, while applying a different tone mapping to input augmented reality image data corresponding with a pixel position in a different grid zone.

As such, to facilitate appropriately tone mapping input augmented reality image data, in some embodiments, the tone mapping block may determine (e.g., identify) a grid zone that includes a corresponding pixel position. In some embodiments, a frame of augmented reality image data may be written to display pixels and, thus, processed in raster order. Accordingly, in such embodiments, the electronic system (e.g., image processing circuitry and/or tone mapping block) may determine a pixel position corresponding with augmented reality image data based at least in part on its processing order relative to other augmented reality image data in the same frame, for example, in view of pixel dimensions of a display panel and/or an active region of the display panel that will be used to display the frame of augmented reality image content.

Based at least in part on the grid zone including a pixel position corresponding with input augmented reality image data, the tone mapping block may determine (e.g., identify and/or select) a target tone mapping (e.g., tone map look-up-table) associated with the grid zone and/or a set of operational parameters corresponding with the grid zone. As described above, the tone mapping block may apply the target tone mapping to input color component brightness levels indicated in the input augmented reality image data to determine corresponding output color component brightness levels to be indicated in output (e.g., display, processed, and/or tone mapped) augmented reality image data. In this manner, as will be described in more detail below, the techniques described in the present disclosure may facilitate adaptively (e.g., spatially) varying tone mapping applied in a frame of augmented reality image content and/or adaptively (e.g., temporally) varying tone mapping applied in different frames of augmented reality image content based at least in part on optical characteristics (e.g., brightness level) of background image content, which, at least in some instances, may facilitate improving perceived quality of augmented reality image content presented on a display panel of an electronic system and, thus, an augmented reality experience provided by the electronic system.

BRIEF DESCRIPTION OF THE DRAWINGS

Various aspects of the present disclosure may be better understood upon reading the following detailed description and upon reference to the drawings in which.

DETAILED DESCRIPTION

Figure 1:
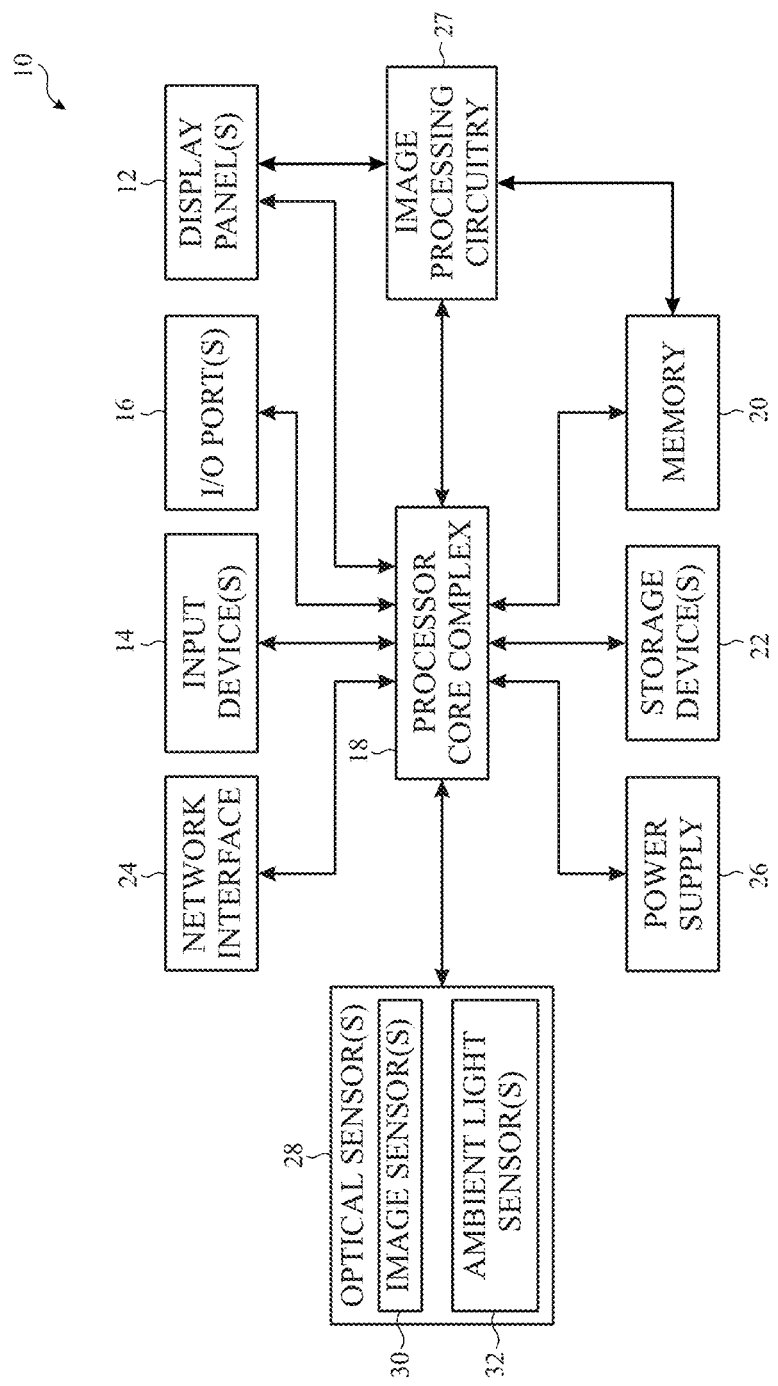
FIG. 1 is a block diagram of an electronic system including one or more display panels, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure generally relates to display panels (e.g., electronic displays), which may be implemented and/or operated to display one or more images (e.g., image frames and/or pictures) to present visual representations of information. Accordingly, electronic systems (e.g., devices), such as computers, mobile phones, portable media devices, tablets, televisions, virtual-reality headsets, and vehicle dashboards, among many others, often include and/or utilize one or more display panels. In any case, a display panel may generally display an image by actively controlling light emission from its display pixels, which each includes one or more color component sub-pixels, based at least in part on image data indicative of target luminance (e.g., brightness level and/or grayscale level) of the display pixels in a corresponding image. For example, based on corresponding image data, a display panel may display augmented reality (e.g., virtual) image content overlaid on background (e.g., real) image content, thereby providing an augmented reality (AR) experience.

To facilitate providing an augmented reality experience, in some instances, a display panel may be implemented and/or operated to actively display (e.g., reproduce) background image content, for example, by controlling light emission from its display pixels based at least in part on corresponding image data generated by an image sensor, such as a camera. In other instances, a display panel may be implemented (e.g., deployed) on a light-transmissive viewing surface, such as a lens of a wearable (e.g., headset) electronic device, a windshield of an automotive vehicle, and/or the like. In particular, the light-transmissive viewing surface may enable environmental light to pass therethrough, thereby enabling a user (e.g., wearer, driver, rider, or operator) to visually perceive background image content. Thus, in such instances, the display panel may facilitate providing an augmented reality experience by displaying augmented reality image content anchored to one or more specific locations in background image content without actively displaying (e.g., reproducing) the background image content.

However, at least in some instances, perception of augmented reality image content may be dependent on optical characteristics, such as color and/or brightness, of background image content on which the augmented reality image content is overlaid (e.g., displayed and/or presented). For example, displaying augmented reality image content overlaid on brighter (e.g., higher luma value) background image content may reduce perceived contrast in the augmented reality image content, thereby resulting in the augmented reality image content appearing washed out compared to displaying the augmented reality image content overlaid on darker (e.g., lower luma value) background image content. In other words, at least in some instances, optical (e.g., visual) characteristics of background image content may affect perceived quality of augmented reality image content overlaid thereon and, thus, perceived quality of an electronic system providing the augmented reality experience.

Accordingly, to facilitate improving augmented reality experience, the present disclosure describes techniques for implementing and/or operating an electronic system, which includes one or more display panels each implemented (e.g., deployed) on a light-transmissive viewing surface, to adaptively adjust presentation (e.g., display) of augmented reality image content based at least in part on expected optical (e.g., visual) characteristics of background image content on which the augmented reality image content is to be overlaid. To facilitate determining the expected optical characteristics of background image content, in some embodiments, the electronic system may include one or more optical sensors. In particular, in some embodiments, the optical sensors may include one or more ambient light sensors, for example, implemented and/or operated to determine (e.g., generate and/or output) an ambient lighting metric indicative of an average (e.g., mean) brightness level (e.g., luma value) of background (e.g., environmental and/or ambient) light.

Additionally, the optical sensors may include one or more image sensors, such as a camera, implemented and/or operated to capture frames of background image content. To capture a frame of background image content, in some embodiments, an image sensor may determine (e.g., sense and/or measure) optical characteristics, such as color and/or brightness level, at specific locations (e.g., points) in the frame, for example, which each corresponds with a pixel position at which a display pixel is implemented on a display panel. The image sensor may determine (e.g., generate and/or output) background image data to indicate the sensed optical characteristics of the background image content. In some embodiments, the image sensor may capture background image content at a specific location by determining captured background image data in color component domains, which may be converted to a luma domain before subsequent processing. For example, a red component brightness (e.g., grayscale) level indicated in the captured background image data, a blue component grayscale level indicated in the captured background image data, and a green component grayscale level indicated in the captured background image data may be weighted (e.g., using coefficients) and combined (e.g., summed together) to determine a luma value indicative of achromatic brightness level at the specific location in the background image content.

To facilitate adaptively adjusting presentation of augmented reality image content, in some embodiments, the electronic system may include image processing circuitry implemented and/or operated to process (e.g., adjust) augmented reality image data before the augmented reality image data is used to display corresponding augmented reality image content. In particular, in some embodiments, the image processing circuitry may receive source augmented reality image data from an image source, process the source augmented reality image data to determine augmented reality display image data that accounts (e.g., compensates) for expected optical characteristics of background image content, and outputs the augmented reality display image data to enable a display panel to present (e.g., display) corresponding augmented reality image content using the augmented reality display (e.g., processed and/or compensated) image data, for example, instead of the source augmented reality image data. To facilitate accounting for expected optical characteristics of background image content, in some embodiments, the image processing circuitry may include a background analysis block (e.g., circuitry group) and a tone mapping block (e.g., circuitry group).

In particular, in some embodiments, a background analysis block in the image processing circuitry may be implemented and/or operated to determine one or more perceived background brightness metrics, which are each indicative of a background brightness expected to be perceived by a user's eye at a specific location in a frame of background image content. Thus, in some embodiments, the background analysis block may determine a perceived background brightness metric associated with a specific location in background image content and, thus, a corresponding pixel position on a display panel based at least in part on corresponding background image data and an ambient lighting metric, for example, in addition to a tint strength applied on a corresponding light-transmissive viewing surface while the display panel is presenting augmented reality image content and/or a target transparency (e.g., opacity) of the augmented reality image content. However, in some embodiments, an image sensor (e.g., camera) of an electronic system that captures background image data may be spatially offset from a user's eye and, thus, captured background image content may differ from the background image content that will actually be perceived by the user's eye via a light-transmissive viewing surface of the electronic system. Accordingly, to facilitate determining a perceived background brightness metric, in some embodiments, the image processing circuitry may process captured background image data to re-project corresponding background image content from the perspective of the image sensor to the expected perspective of the user's eye.

In some embodiments, a tone mapping block in the image processing circuitry may process input (e.g., source) augmented reality image data by tone mapping the input augmented reality image data based at least in part on an associated set of operational parameters, which includes a perceived background brightness metric associated with background image content on which corresponding augmented reality image content is to be overlaid, for example, in addition to target transparency of the augmented reality image content and/or a histogram of brightness levels (e.g., luma values) in a preceding (e.g., directly previous) augmented reality image content. To facilitate improving perceived quality of augmented reality image content, in some embodiments, the tone mapping block may apply different tone mappings under different sets of operational parameters. For example, the tone mapping block may apply a stronger tone mapping to input augmented reality image data to boost contrast of corresponding augmented reality when the augmented reality image content is to be displayed on brighter background image content compared to when the augmented reality image content is to be displayed on darker background image content. In other words, in some embodiments, the tone mapping block may apply a stronger tone mapping to input augmented reality image content associated with set of operational parameters including a higher (e.g., larger and/or brighter) perceived background brightness metric compared to the tone mapping applied to input augmented reality image content associated with set of operational parameters including a lower (e.g., smaller and/or darker) perceived background brightness metric.

As another example, the tone mapping block may additionally or alternatively apply a stronger tone mapping to input augmented reality image data to boost contrast of corresponding augmented reality when directly preceding augmented reality image content is darker while applying a weaker tone mapping to the input augmented reality image data when the directly preceding augmented reality image content is brighter. In other words, in some embodiments, the tone mapping block may additionally or alternatively apply a stronger tone mapping to input augmented reality image data associated with set of operational parameters including a previous augmented reality content histogram that is skewed brighter and a weaker tone mapping to input augmented reality image data associated with set of operational parameters including a previous augmented reality content histogram that is skewed darker. As a further example, the tone mapping block may additionally or alternatively apply a stronger tone mapping to input augmented reality image data associated with a set of operational parameters indicative of a lower target transparency while applying a weaker tone mapping to input augmented reality image data associated with a set of operational parameters indicative of a higher target transparency.

To facilitate tone mapping, in some embodiments, the tone mapping block may include and/or utilize one or more tone map look-up-tables (LUTs). In particular, a tone map look-up-table may be implemented to map a color component (e.g., red, green, or blue) brightness (e.g., grayscale) level indicated in augmented reality input image data to a corresponding color component brightness level indicated in output (e.g., display) augmented reality image data, for example, which is supplied to downstream image processing circuitry for further processing and/or a display panel to enable the display panel to display corresponding augmented reality image content.

To facilitate adaptively adjusting tone mapping applied to augmented reality image content, in some embodiments, the tone mapping block may include and/or utilize (e.g., consider) multiple different candidate tone map look-up-tables, for example, each corresponding with a different set of operational parameters. In particular, to facilitate tone mapping input augmented reality image data, in such embodiments, the tone mapping block may determine (e.g., receive) a set of operational parameters associated with the input augmented reality image data and, thus, corresponding augmented reality image content. Additionally, the tone mapping block may select a candidate tone map look-up-table corresponding with the set of operational parameters associated with the augmented reality image content as a target tone map look-up-table and apply the target tone map look-up-table to the input augmented reality image data to determine corresponding output augmented reality image data.

However, at least in some instances, perceived brightness of background image content may vary over an image frame. In fact, at least in some instances, capturing different portions of background image content, which are or would be perceived by a user as having approximately (e.g., substantially) the same optical characteristics, may nevertheless result in captured background image data indicating different brightness levels and, thus, different perceived background brightness metrics being determined, for example, due to the background image content including real world and/or natural content. In other words, at least in some instances, determining perceived background brightness metrics directly using captured background image data or even re-projected background image data may result in each pixel position being associated with a different set of operational parameters and, thus, different tone mappings (e.g., target tone map look-up-tables) being applied.

To facilitate improving operational and/or computational efficiency, in some embodiments, an electronic system (e.g., image processing circuitry and/or background analysis block) may determine a local tone map grid, which includes one or more grid zones (e.g., regions). As will be described in more detail below, a grid zone in a local tone map grid corresponding with an image frame may group together adjacent pixel positions in an active region of a display panel that will be used to display augmented reality image content overlaid on background image content having approximately (e.g., substantially) the same optical characteristics. To facilitate identifying background image content with approximately the same optical characteristics, in some embodiments, the electronic system may filter re-projected background image data. For example, image processing circuitry implemented in the electronic system may low pass filter the re-projected background image data to determine filtered background image data, which, at least in some instances, may reduce the number of different background brightness level compared to the re-projected background image data.

In other words, compared to corresponding re-projected background image data, filtered background image data corresponding with a frame of background image content may increase likelihood that adjacent pixel positions, which are associated with approximately the same background optical characteristics, are identified as having the same background brightness level (e.g., luma value). Merely as an illustrative non-limiting example, first re-projected background image data associated with a first pixel position may indicate a first brightness level of sixty-five whereas second re-projected background image data associated with a second (e.g., different) pixel position, which is adjacent the first pixel position, may indicate a second brightness level of sixty-six. However, low pass filtering the first re-projected background image data and the second re-projected background image data may result in first filtered background image data corresponding with the first pixel position and second filtered background image data corresponding with the second pixel position indicating the same filtered background brightness level (e.g., luma value). In other words, at least in some instances, filtering re-projected background image data may result in captured background brightness levels being rounded to a coarser granularity, which, at least in some instances, may facilitate reducing the number of different operational parameter sets associated with the active area and, thus, the number of different tone mapping to be applied in a frame of augmented reality image content.

As such, in some embodiments, an electronic system (e.g., image processing circuitry and/or background analysis block) may determine a local tone map grid for a frame based at least in part on analysis of filtered background image data corresponding with background image content over which an active region of a display panel is expected to display augmented reality image content. In particular, the electronic system may analyze the filtered background image data to identify one or more grid zones in the active region that each groups together adjacent pixel positions associated with the same filtered background brightness level. To help illustrate, continuing with the above example, the electronic system may include the first pixel position and the second pixel position, which is adjacent the first pixel position, in the same grid zone of the local tone map grid due to a first filtered background brightness level indicated in the first filtered background image data matching a second filtered background brightness level indicated in the second background filtered image data.

In other words, since an ambient lighting metric is indicative of average background brightness level, pixel positions in the same grid zone may be associated with the same perceived background brightness metric. In fact, in some embodiments, each pixel position in a grid zone may be associated with the same set of operational parameters. In other words, in some such embodiments, a tone mapping block may apply the same tone mapping (e.g., target tone map look-up-table) to input augmented reality image data corresponding with each pixel position in a grid zone, for example, while applying a different tone mapping to input augmented reality image data corresponding with a pixel position in a different grid zone.

As such, to facilitate appropriately tone mapping input augmented reality image data, in some embodiments, the tone mapping block may determine (e.g., identify) a grid zone that includes a corresponding pixel position. In some embodiments, a frame of augmented reality image data may be written to display pixels and, thus, processed in raster order. Accordingly, in such embodiments, the electronic system (e.g., image processing circuitry and/or tone mapping block) may determine a pixel position corresponding with augmented reality image data based at least in part on its processing order relative to other augmented reality image data in the same frame, for example, in view of pixel dimensions a display panel and/or an active region of the display panel that will be used to display the frame of augmented reality image content.

Based at least in part on the grid zone including a pixel position corresponding with input augmented reality image data, the tone mapping block may determine (e.g., identify and/or select) a target tone mapping (e.g., tone map look-up-table) associated with the grid zone and/or a set of operational parameters corresponding with the grid zone. As described above, the tone mapping block may apply the target tone mapping to input color component brightness levels indicated in the input augmented reality image data to determine corresponding output color component brightness levels to be indicated in output (e.g., display, processed, and/or tone mapped) augmented reality image data. In this manner, as will be described in more detail below, the techniques described in the present disclosure may facilitate adaptively (e.g., spatially) varying tone mapping applied in a frame of augmented reality image content and/or adaptively (e.g., temporally) varying tone mapping applied in different frames of augmented reality image content based at least in part on optical characteristics (e.g., brightness level) of background image content, which, at least in some instances, may facilitate improving perceived quality of augmented reality image content presented on a display panel of an electronic system and, thus, an augmented reality experience provided by the electronic system.

To help illustrate, an example of an electronic system 10, which includes and/or utilizes one or more display panels 12, is shown in FIG. 1. As will be described in more detail below, in some embodiments, the electronic system 10 may be any suitable electronic device, such as an augmented reality (e.g., mixed-reality) headset and/or the like. Additionally or alternatively, the electronic system 10 may be included in an electrical system, for example, deployed in an automotive vehicle. Thus, it should be noted that FIG. 1 is merely one example of a particular implementation and is intended to illustrate the types of components that may be present in an electronic system 10.

In addition to the one or more display panels 12, as depicted, the electronic system 10 includes one or more input devices 14, one or more input/output (I/O) ports 16, a processor core complex 18 having one or more processors or processor cores, main memory 20, one or more storage devices 22, a network interface 24, a power supply 26, image processing circuitry 27, and one or more optical sensors 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the main memory 20 and a storage device 22 may be included in a single component. Additionally or alternatively, the image processing circuitry 27 may be included in the processor core complex 18 or the display panel 12.

As depicted, the processor core complex 18 is operably coupled with main memory 20 and the storage device 22. As such, in some embodiments, the processor core complex 18 may execute instruction stored in main memory 20 and/or a storage device 22 to perform operations, such as generating image data. Additionally or alternatively, the processor core complex 18 may operate based on circuit connections formed (e.g., programmed) therein. As such, in some embodiments, the processor core complex 18 may include one or more general purpose microprocessors, one or more application specific processors (ASICs), one or more field programmable logic arrays (FPGAs), or any combination thereof.

In addition to instructions, in some embodiments, the main memory 20 and/or the storage device 22 may store data, such as image data. Thus, in some embodiments, the main memory 20 and/or the storage device 22 may include one or more tangible, non-transitory, computer-readable media that store instructions executable by processing circuitry, such as the processor core complex 18 and/or the image processing circuitry 27, and/or data to be processed by the processing circuitry. For example, the main memory 20 may include random access memory (RAM) and the storage device 22 may include read only memory (ROM), rewritable non-volatile memory, such as flash memory, hard drives, optical discs, and/or the like.

As depicted, the processor core complex 18 is also operably coupled with the network interface 24. In some embodiments, the network interface 24 may enable the electronic system 10 to communicate with a communication network and/or another electronic system 10. For example, the network interface 24 may connect the electronic system 10 to a personal area network (PAN), such as a Bluetooth network, a local area network (LAN), such as an 802.11x Wi-Fi network, and/or a wide area network (WAN), such as a 4G or LTE cellular network. In other words, in some embodiments, the network interface 24 may enable the electronic system 10 to transmit data (e.g., image data) to a communication network and/or receive data from the communication network.

Additionally, as depicted, the processor core complex 18 is operably coupled to the power supply 26. In some embodiments, the power supply 26 may provide electrical power to operate the processor core complex 18 and/or other components in the electronic system 10, for example, via one or more power supply rails. Thus, the power supply 26 may include any suitable source of electrical power, such as a rechargeable lithium polymer (Li-poly) battery and/or an alternating current (AC) power converter.

Furthermore, as depicted, the processor core complex 18 is operably coupled with one or more I/O ports 16. In some embodiments, the I/O ports 16 may enable the electronic system 10 to interface with another electronic system 10. For example, a portable storage device may be connected to an I/O port 16, thereby enabling the electronic system 10 to communicate data, such as image data, with the portable storage device.

Moreover, as depicted, the processor core complex 18 is operably coupled with one or more optical sensors 28. As in the depicted example, the optical sensors 28 may include one or more ambient light sensors 32. As will be described in more detail below, in some embodiments, an ambient light sensor 32 may be implemented and/or operated to determine (e.g., generate and/or output) an ambient lighting metric indicative of average brightness level (e.g., luma value) of background (e.g., environmental and/or ambient) light, for example, spatially averaged over an image frame and/or temporally averaged over multiple (e.g., successively) image frames. Additionally, as in the depicted example, the optical sensors 28 may include one or more image sensors 30, such as one or more cameras. As will be described in more detail below, in some embodiments, an image sensor 30 may be implemented and/or operated to determine (e.g., capture, generate, and/or output) background image data indicative of brightness levels (e.g., luma value) at specific locations in a frame of background image content.

As depicted, the processor core complex 18 is also operably coupled with one or more input devices 14. In some embodiments, an input device 14 may enable a user to interact with the electronic system 10. For example, the input devices 14 may include one or more buttons, one or more keyboards, one or more mice, one or more trackpads, and/or the like. Additionally, in some embodiments, the input devices 14 may include touch sensing components implemented on the display panel 12. In such embodiments, the touch sensing components may receive user inputs by detecting occurrence and/or position of an object contacting the display surface of the display panel 12.

In addition to enabling user inputs, the display panel 12 may facilitate providing visual representations of information by displaying one or more images (e.g., image frames or pictures). For example, the display panel 12 may display a graphical user interface (GUI) of an operating system, an application interface, text, a still image, or video content. To facilitate displaying images, as will be described in more detail below, the display panel 12 may include driver (e.g., control) circuitry—namely a scan driver and a data driver—and one or more display pixels.

As described above, a display panel 12 may display an image by controlling light emission from its display pixels based at least in part on corresponding image data, which is indicative of target luminance (e.g., brightness level and/or grayscale level) of the display pixels in a corresponding image. In some embodiments, image data may be generated by an image source, such as the processor core complex 18, a graphics processing unit (GPU), and/or an image sensor. Additionally or alternatively, image data may be received from another electronic system 10, for example, via the network interface 24 and/or an I/O port 16. Moreover, in some embodiments, a display panel 12 may be implemented (e.g., deployed) on a light-transmissive viewing surface of the electronic system 10, for example, to enable the electronic system 10 to provide an augmented reality experience.

Figure 2:
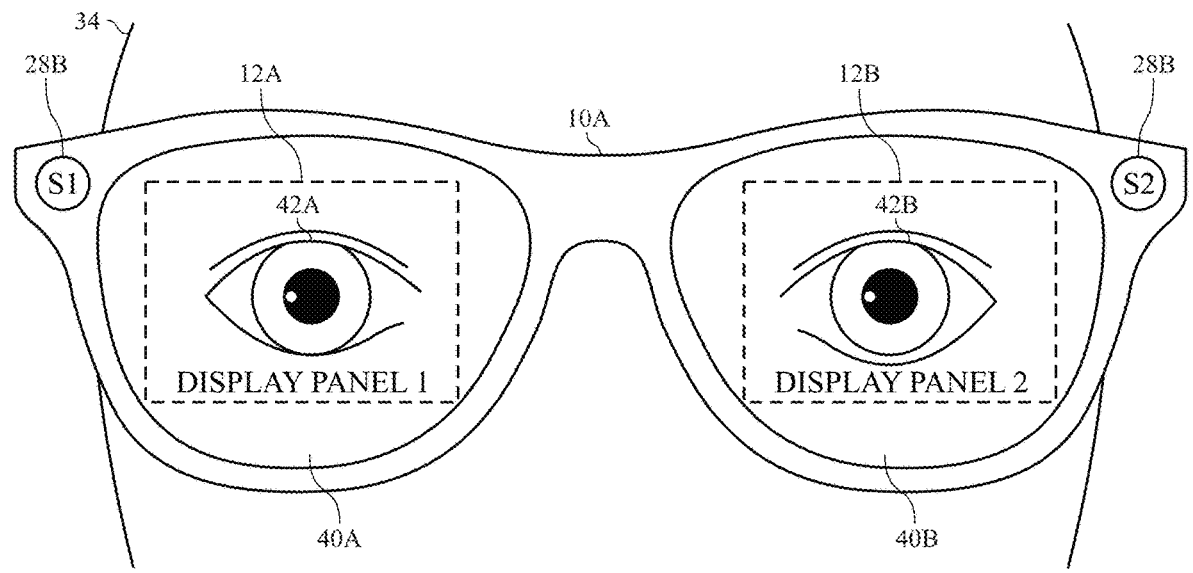
FIG. 2 is an example of the electronic device of FIG. 1 including display panels implemented on light-transmissive viewing surfaces, in accordance with an embodiment of the present disclosure.
Figure 3:
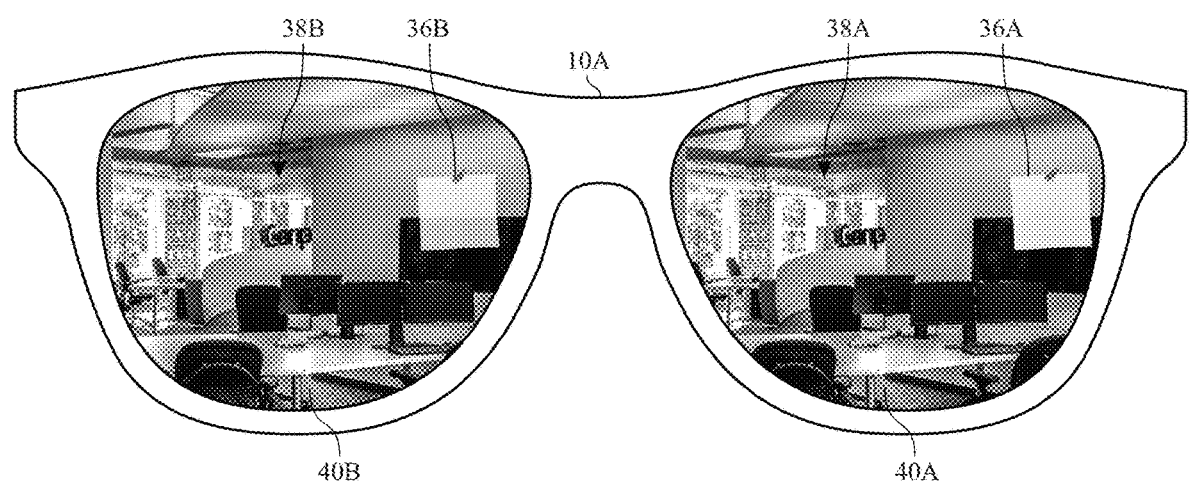
FIG. 3 is an example of image frames perceived through the light-transmissive viewing surfaces of FIG. 2, in accordance with an embodiment of the present disclosure.

To help illustrate, an example electronic system 10—namely an augmented reality headset (e.g., glasses) system 10A—is shown in FIGS. 2 and 3. In particular, FIG. 2 shows the augmented reality headset system 10A being worn by a user 34. On the other hand, FIG. 3 shows an example of image frames, which includes augmented reality (e.g., virtual) image content 36 overlaid on background (e.g., real) image content 38, viewed from the perspective of the user 34. However, it should be appreciated that the depicted examples are merely intended to illustrative and not limiting.

As in the example depicted in FIG. 2, the augmented reality headset system 10A may include multiple light-transmissive viewing surfaces (e.g., lenses) 40. In particular, the augmented reality headset system 10A includes a first light-transmissive viewing surface 40A, which may enable a first (e.g., right) eye 42A of the user 34 to visually perceive background image content 38, such as the frame of first background image content 38A shown in FIG. 3. The augmented reality headset system 10A also includes a second light-transmissive viewing surface 40B, which may enable a second (e.g., left) eye 42B of the user 34 to visually perceive background image content 38, such as the frame of second background image content 38B shown in FIG. 3. As in the example of FIG. 3, the first background image content 38A viewed through the first light-transmissive viewing surface 40A may be spatially offset from the second background image content 38B viewed through the second light-transmissive viewing surface 40B, for example, due to spatial offset between the user's first eye 42A and the user's second eye 42B.

Additionally, as in the example depicted in FIG. 2, the augmented reality headset system 10A may include multiple optical sensors 28 implemented (e.g., deployed) proximate its light-transmissive viewing surfaces 40. In particular, the augmented reality headset system 10A includes a first optical sensor 28A proximate the first light-transmissive viewing surface 40A and a second optical sensor 28B proximate the second light-transmissive viewing surface 40B. In some embodiments, the first optical sensor 28A and/or the second optical sensor 28B may be an image sensor 30 that captures a frame of background image content 38 by generating captured background image data indicative of optical (e.g., visual) characteristics, such as color and/or brightness level, at one or more specific locations in the background image content 38. Additionally or alternatively, the first optical sensor 28A and/or the second optical sensor 28B may be an ambient light sensor 32 that determines (e.g., generates and/or outputs) an ambient lighting metric indicative of average (e.g., mean) brightness level (e.g., luma value) of background (e.g., environmental and/or ambient) light.

Furthermore, as in the example depicted in FIG. 2, the augmented reality headset system 10A may include multiple display panels 12 implemented (e.g., deployed) on the light-transmissive viewing surfaces (e.g., lenses) 40. In particular, the augmented reality headset system 10A may include a first display panel 12A implemented on the first light-transmissive viewing surface 40A to enable actively displaying augmented reality image content 36, such as the frame of first augmented reality image content 36A shown in FIG. 3. The augmented reality headset 10A may also include a second display panel 12B implemented on the second light-transmissive viewing surface 40B to enable actively displaying augmented reality image content 36, such as the frame of second augmented reality image content 36B shown in FIG. 3.

In this manner, an augmented reality headset system 10A may be implemented to provide an augmented reality experience. However, it should again be appreciated that the depicted examples are merely intended to be illustrative and not limiting. For example, in other embodiments, a display panel 12 may be implemented with a non-rectangular shape and/or implemented across an entire light-transmissive viewing surface 40. Moreover, other types of electronic systems 10 may additionally or alternatively be implemented and/or operated to provide an augmented reality experience in accordance with the techniques described in the present disclosure.

Figure 4:
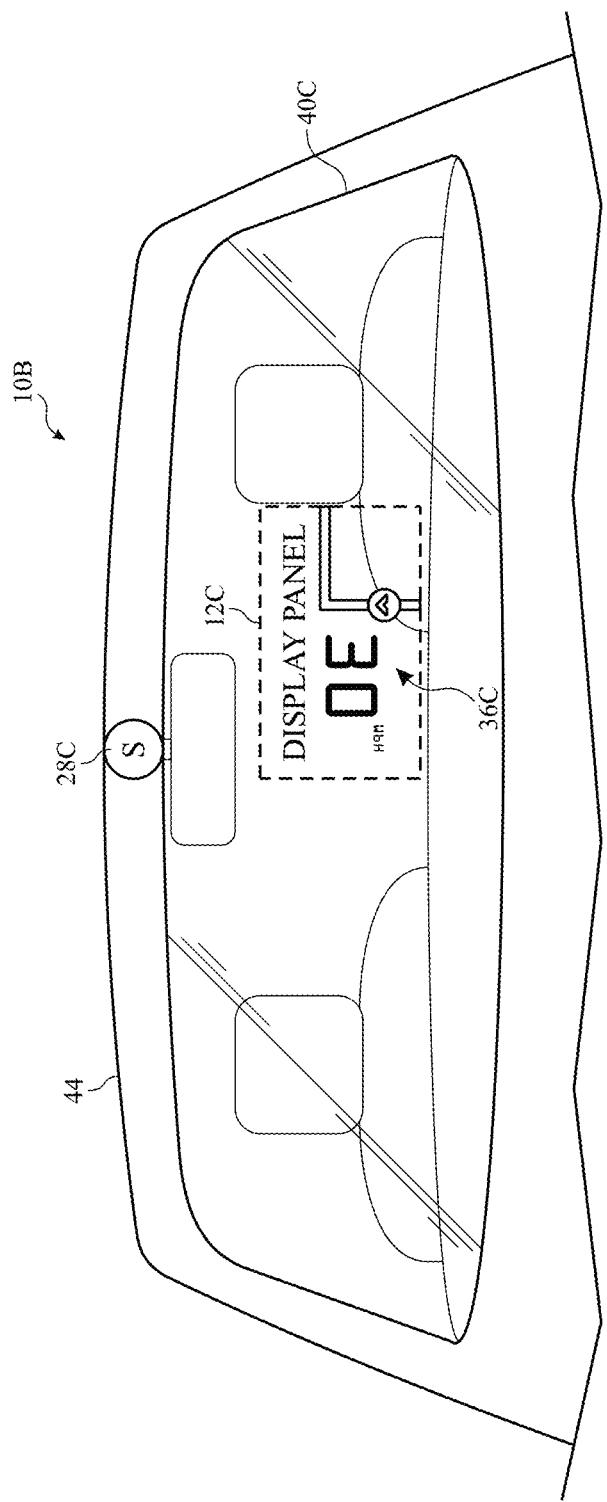
FIG. 4 is another example of a display panel implemented on a light-transmissive viewing surface, in accordance with an embodiment of the present disclosure.

To help illustrate, another example an electronic system 10—namely a heads-up display system 10B—is shown in FIG. 4. As depicted, the heads-up display system 10B is deployed in an automotive vehicle 44, for example, as part of its electrical system. However, it should be appreciated that the depicted example is merely intended to illustrative and not limiting.

As depicted, the heads-up display system 10B includes a light-transmissive viewing surface (e.g., windshield) 40C, which may enable a user 34 (e.g., driver or rider) to visually perceive background image content 38, such as another automotive vehicle 44 and/or a road on which the automotive vehicle 44 is traveling. Additionally, as in the depicted example, the heads-up display system 10B may include one or more optical sensors 28C, such as an image sensor 30 and/or an ambient light sensor 32, deployed proximate the light-transmissive viewing surface 40C.

Furthermore, as depicted, the heads-up display system 10B includes a display panel 12C. As in the depicted example, the display panel 12C may be implemented and/or operated to display augmented reality image content 36C, such as a visual representation of current speed of the automotive vehicle 44 and/or a map. In some embodiments, the display panel 12C may be integrated with the light-transmissive viewing surface 40C. In other embodiments, the display panel 12C may be separate from the light-transmissive viewing surface 40C, for example, such that the display panel 12C is implemented between the user 34 and the light-transmissive viewing surface 40C.

In this manner, a heads-up display system 10B may be implemented to provide an augmented reality experience. In particular, as described above, an electronic system 10 may provide an augmented reality experience by actively displaying augmented reality image content 36 based at least in part on corresponding augmented reality image data such that the augmented reality image content is perceived as being overlaid on background image content 38 viewed through a light-transmissive viewing surface 40. However, as at least in some instances, perception of augmented reality image content 36 and, thus, perceived quality of an augmented reality experience provided by the electronic system 10 may vary with optical (e.g., visual) characteristics of background image content 38. As such, to facilitate improving augmented reality experience, in some embodiments, image processing circuitry 27 in the electronic system 10 may be implemented and/or operated to process (e.g., adjust) augmented reality image data based at least in part on expected optical characteristics of the background image content 38 before the augmented reality image data is used to display corresponding augmented reality image content 36.

Figure 5:
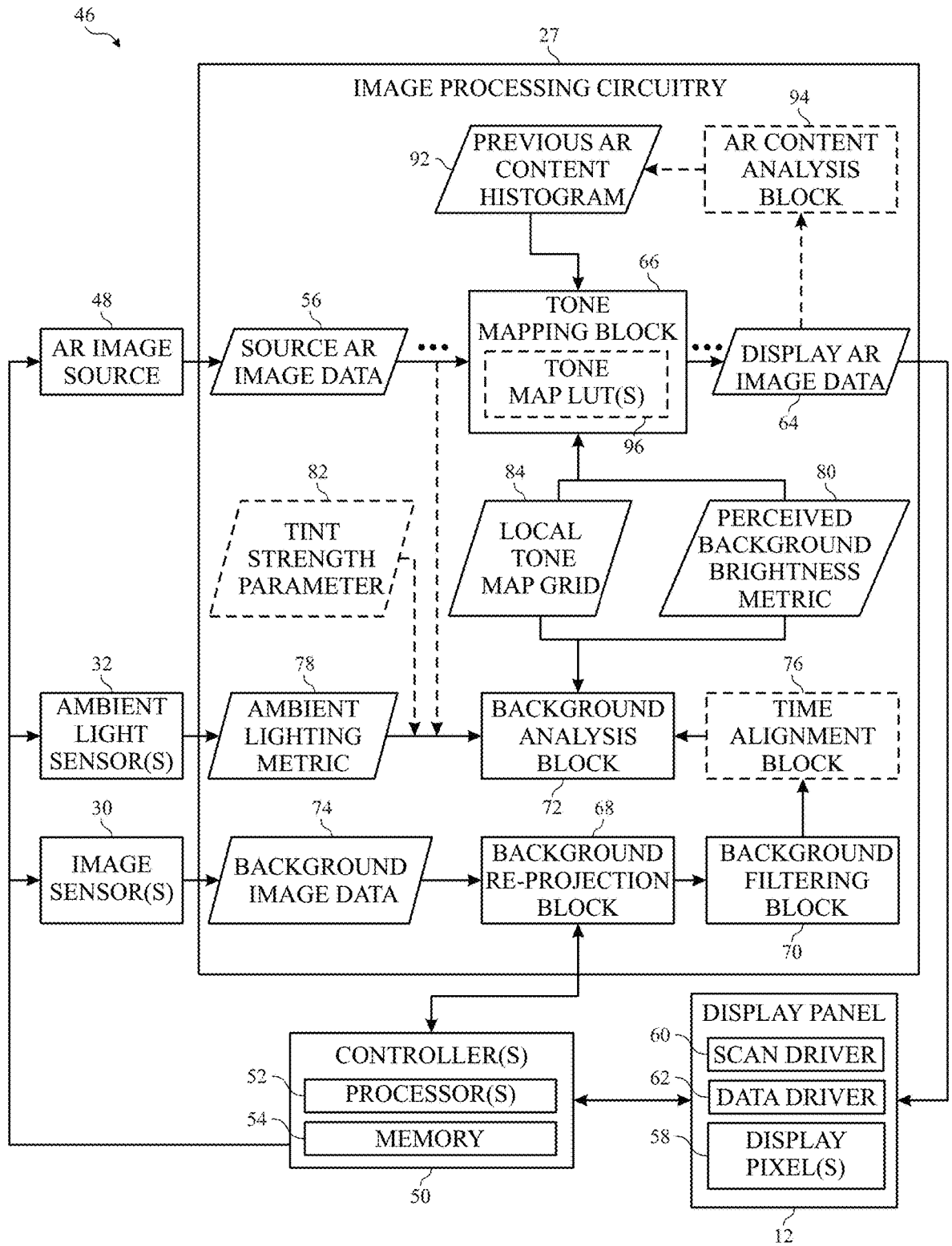
FIG. 5 is a block diagram of an example portion of the electronic system of FIG. 1 including image processing circuitry, which includes a local tone mapping block and a background analysis block, and a display panel, in accordance with an embodiment of the present disclosure.

To help illustrate, an example of a portion 46 of an electronic system 10, which includes image processing circuitry 27, is shown in FIG. 5. As in the depicted example, the image processing circuitry 27 may be communicatively coupled between an augmented reality (AR) image source 48 and a display panel 12. Additionally, as in the depicted example, the image processing circuitry 27 may be communicatively coupled to one or more image sensors 30, one or more ambient light sensors 32, and one or more controllers 50. However, it should be appreciated that the depicted example is merely intended to illustrative and not limiting.

In some embodiments, a controller 50 may generally control operation of the augmented reality image source 48, the image processing circuitry 27, the display panel 12, the one or more image sensors 30, the one or more ambient light sensors 32, or any combination thereof. Although depicted as a single controller 50, in other embodiments, one or more separate controllers 50 may be used to control operation of the augmented reality image source 48, the image processing circuitry 27, the display panel 12, the one or more image sensors 30, the one or more ambient light sensors 32, or any combination thereof. To facilitate controlling operation, as in the depicted example, the controller 50 may include one or more controller processors (e.g., processing circuitry) 52 and controller memory 54.

In some embodiments, the controller processor 52 may be included in the processor core complex 18 and/or separate processing circuitry and the controller memory 54 may be included in main memory 20, a storage device 22, and/or a separate, tangible, non-transitory computer-readable medium. Additionally, in some embodiments, the controller processor 52 may execute instructions and/or process data stored in the controller memory 54 to control operation of the augmented reality image source 48, the image processing circuitry 27, the display panel 12, the one or more image sensors 30, and/or the one or more ambient light sensors 32. In other embodiments, the controller processor 52 may be hardwired with instructions that, when executed, control operation of the image processing circuitry 27, the display panel 12, the one or more image sensors 30, the one or more ambient light sensors 32, and/or the augmented reality image source 48.

Generally, the augmented reality (AR) image source 48 may be implemented and/or operated to generate source (e.g., input or original) augmented reality image data 56 corresponding with augmented reality image content 36 to be displayed on the display panel 12. Thus, in some embodiments, the augmented reality image source 48 may be included in the processor core complex 18, a graphics processing unit (GPU), an image sensor (e.g., camera) 30, and/or the like. To facilitate displaying images, as in the depicted example, the display panel 12 may include one or more display pixels 58, which each includes one or more color component sub-pixels, and driver circuitry, which includes a scan driver 60 and a data driver 62. For example, each display pixel 58 implemented on a display panel 12 may include a red component sub-pixel, a blue component sub-pixel, and a green component sub-pixel. As another example, a display panel 12 may include a first set (e.g., half) of display pixels 58, which each include a red component sub-pixel and a green component sub-pixel, and a second set (e.g., half) of display pixels 58, which each includes a blue component sub-pixel and a green component sub-pixel. In some embodiments, one or more display pixels 58 implemented on a display panel 12 may include a white component sub-pixel.

As described above, a display panel 12 may display an image by appropriately controlling light emission from its display pixels 58. Generally, light emission from a display pixel 58 may vary with the magnitude of electrical energy stored therein. For example, in some instances, a display pixel 58 may include a light emissive element, such as an organic light-emitting diode (OLED), that varies its light emission with current flow therethrough, a current control switching device (e.g., transistor) coupled between the light emissive element and a pixel power (e.g., VDD) supply rail, and a storage capacitor coupled to a control (e.g., gate) terminal of the current control switching device. As such, varying the amount of energy stored in the storage capacitor may vary voltage applied to the control terminal of the current control switching device and, thus, magnitude of electrical current supplied from the pixel power supply rail to the light emissive element of the display pixel 58.

However, it should be appreciated that discussion with regard to OLED display pixels 58 and OLED display panels 12 is merely intended to be illustrative and not limiting. In other words, the techniques described in the present disclosure may be applied to and/or adapted for other types of display panels 12, such as a liquid crystal display (LCD) panels 12 and/or a micro light-emitting diode (LED) display panels 12. In any case, since light emission from a display pixel 58 generally varies with electrical energy storage therein, to display an image, a display panel 12 may write a display pixel 58 at least in part by supplying an analog electrical (e.g., voltage and/or current) signal to the display pixel 58, for example, to charge and/or discharge a storage capacitor implemented in the display pixel 58.

To facilitate selectively writing its display pixels 58, in some embodiments, a display panel 12 may be implemented such that each of its display pixels 58 is coupled to the scan driver 60 via a corresponding scan line and to the data driver 62 via a corresponding data line. For example, to write a row of display pixels 58, the scan driver 60 may output an activation (e.g., logic high) control signal to a corresponding scan line that causes each display pixel 58 coupled to the scan line to electrically couple its storage capacitor to a corresponding data line. Additionally, the data driver 62 may output an analog electrical signal to each data line coupled to an activated display pixel 58 to control the amount of electrical energy stored in the display pixel 58 and, thus, resulting light emission (e.g., perceived luminance and/or perceived brightness).

As described above, image data corresponding with an image may be indicative of target luminance (e.g., grayscale level and/or brightness level) at one or more specific points (e.g., image pixels) in the image, for example, by indicating color component brightness (e.g., grayscale) levels that are scaled by a panel brightness setting. In other words, the image data may correspond with a pixel position and, thus, indicate target luminance of a corresponding display pixel 58 implemented at the pixel position on the display panel 12. For example, the image data may include red component image data indicative of target luminance of a red component sub-pixel in the display pixel 58, blue component image data indicative of target luminance of a blue component sub-pixel in the display pixel 58, green component image data indicative of target luminance of a green component sub-pixel in the display pixel 58, white component image data indicative of target luminance of a white component sub-pixel in the display pixel, or any combination thereof. As such, to display an image, the display panel 12 may control supply (e.g., magnitude and/or duration) of analog electrical signals from its data driver 62 to its display pixels 58 based at least in part on corresponding image data. For example, to display augmented reality image content 36, the display panel 12 may control supply of analog electrical signals from its data driver 62 to color component sub-pixels in one or more of its display pixels 58 based at least in part on corresponding color component brightness levels indicated in augmented reality image data.

However, to facilitate improving perceived image quality, image processing circuitry 27 may be implemented and/or operated to process (e.g., adjust) image data before the image data is used to display a corresponding image on the display panel 12. Thus, in some embodiments, the image processing circuitry 27 may be included in the processor core complex 18, a display pipeline (e.g., chip or integrated circuit device), a timing controller (TCON) in the display panel 12, or any combination thereof. Additionally or alternatively, the image processing circuitry 27 may be implemented as a system-on-chip (SoC).

As in the depicted example, the image processing circuitry 27 may be implemented and/or operated to process source augmented reality (AR) image data 56 output from the augmented reality image source 48. In some embodiments, the image processing circuitry 27 may directly receive the source image data from the augmented reality image source 48. Additionally or alternatively, the source augmented reality image data 56 output from the augmented reality image source 48 may be stored in a tangible, non-transitory, computer-readable medium, such as main memory 20, and, thus, the image processing circuitry 27 may receive (e.g., retrieve) the source augmented reality image data from the tangible, non-transitory, computer-readable medium, for example, via a direct memory access (DMA) technique.

The image processing circuitry 27 may process the source augmented reality image data 56 to generate display (e.g., processed or output) augmented reality (AR) image data 64, for example, which adjusts target luminances to compensate for expected optical characteristics of background image content 38, ambient lighting conditions, pixel (e.g., sub-pixel) layout on the display panel 12, burn-in on the display panel 12, expected response of the display panel 12, or any combination thereof. The display augmented reality image data 64 may be supplied (e.g., output) to the display panel 12 to enable display panel 12 to display corresponding augmented reality image content 36, for example, overlaid on background image content 38. Due to the processing (e.g., compensation) performed by the image processing circuitry 27, at least in some instances, displaying augmented reality image content 36 based on corresponding display (e.g., processed) augmented image data 64 may facilitate improving perceived quality of the augmented reality image content 36 and, thus, augmented reality experience, for example, compared to displaying the augmented reality image content 36 directly using corresponding source augmented reality image data 56.

In some embodiments, the image processing circuitry 27 may be organized into one or more image processing blocks (e.g., circuitry groups). For example, the image processing circuitry 27 may include a tone mapping block 66 implemented and/or operated to process augmented reality image data at least in part by tone mapping to adjust one or more target brightness (e.g., grayscale) levels indicated in the augmented reality image data. In particular, as will be described in more detail below, to facilitate improving perceived image quality, the tone mapping block 66 may adaptively adjust tone mapping applied to augmented reality image data based at least in part on optical (e.g., visual) characteristics, such as color and/or brightness level, of background image content 38 over which corresponding augmented reality image content 36 is expected to be overlaid.

To facilitate adaptively adjusting tone mapping based on expected optical characteristics of background image content 38, as in the depicted example, the image processing circuitry 27 may additionally include a background re-projection block 68, a background filtering block 70, and a background analysis block 72. As in the depicted example, the background re-projection block 68 may receive background image data 74, which is indicative of expected optical characteristics, such as brightness level (e.g., luma value), at one or more specific locations in background image content 38, output from an image sensor 30. In other words, the background re-projection block 68 may receive background image data 74 captured by the image sensor 30.

However, as described above, an image sensor 30 is often spatially offset from an expected location of a user's eye 42. As such, to facilitate determining optical characteristics of background image content 38 on which augmented reality image content 36 is expected to be overlaid, the background re-projection block 68 may re-project the captured background image data 74 to compensate for the spatial offset between the image sensor 30 and the expected location of the user's eye 42. In other words, the background re-projection block 68 may re-project the captured background image data 74 from the perspective of the image sensor 30 to the expected visual perspective of the user's eye 42.

Figure 6:
FIG. 6 is an example of a frame of captured background image content, in accordance with an embodiment of the present disclosure.
Figure 7:
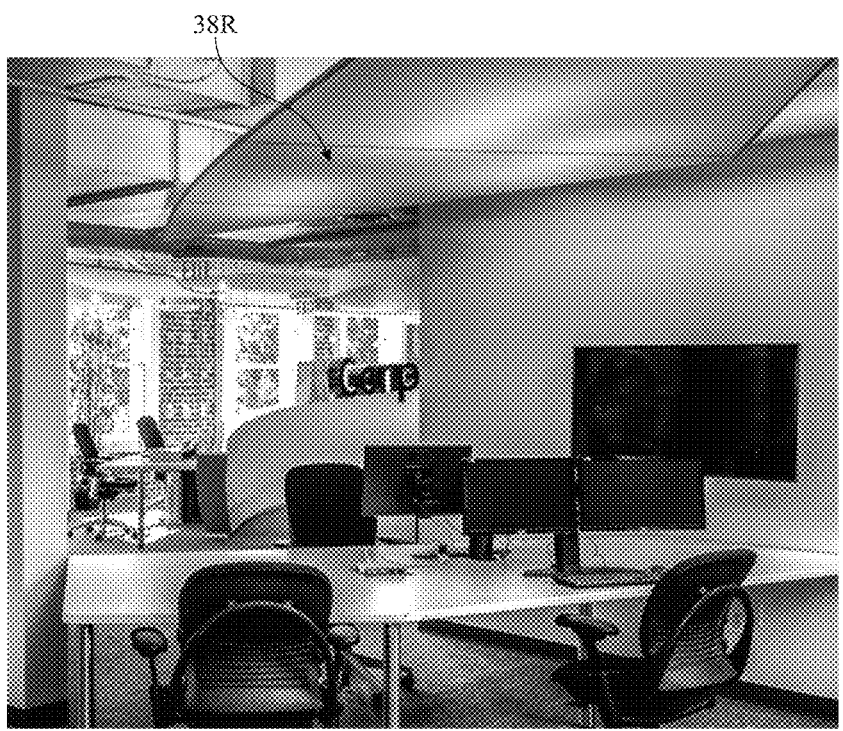
FIG. 7 is an example of a frame of re-projected background image content determined by re-projecting the captured background image content of FIG. 6, in accordance with an embodiment of the present disclosure.

To help illustrate, an example of a frame of captured background image content 38C is shown in FIG. 6. Additionally, an example of a frame of re-projected background image content 38R, which results from re-projecting the captured background image content 38C of FIG. 6, is shown in FIG. 7. However, it should be appreciated that the depicted examples are merely intended to be illustrative and not limiting.

With regard to FIG. 6, the captured background image content 38C may correspond with the first background image content 38A viewed by a user's first eye 42A through the first light-transmissive viewing surface 40A of FIG. 3 and the second background image content 38B viewed by a user's second eye 42B through the second light-transmissive viewing surface 40B of FIG. 3. However, as depicted, the captured background image content 38C of FIG. 6 has a larger field of view (e.g., viewing angle) compared to the field of view provided by the light-transmissive viewing surfaces 40 of FIG. 3. Accordingly, in some embodiments, the re-projected background image content 38R may be generated by cropping and/or resizing the captured background image content 38C to re-project the captured background image content 38C to the expected visual perspective of a user's eye 42.

In fact, in some embodiments, the same captured background image content 38C may be re-projected to generate multiple different versions of re-projected background image content 38R. For example, first re-projected background image content 38R may be determined by re-projecting the captured background image content 38C from the perspective of an image sensor 30 to the expected visual perspective of the user's first eye 42A and second re-projected background image content 38R may be determined by re-projecting the captured background image content 38C from the perspective of the image sensor 30 to the expected visual perspective of the user's second eye 42B. Due to the spatial offset between the user's eyes 42, the first re-projected background image content 38R may differ from the second re-projected background image content 38R and, thus, first re-projected background image data 74 corresponding with the first re-projected background image content 38R may differ from second re-projected background image data 74 corresponding with the second re-projected background image content 38R.

Returning to the image processing circuitry 27 of FIG. 5, the background filtering block 70 may receive background image data 74 output from the background re-projection block 68. In other words, the background filtering block 70 may receive re-projected background image data 74 corresponding with a frame of re-projected background image content 38R. As will be described in more detail below, in some embodiments, the tone mapping block 66 may apply different tone mappings for different background brightness levels (e.g., luma values). In other words, at least in some instances, the number of different tone mappings to be applied by image processing circuitry 27 in a frame of augmented reality image content 36 and, thus, operational efficiency of the image processing circuitry 27 may vary with the number of different brightness levels indicated in background image data 74 of a corresponding frame of background image content 38.

Accordingly, to facilitate improving operational efficiency, in some embodiments, the background filtering block 70 may be implemented and/or operated to filter re-projected background image data 74. For example, the background filtering block 70 may low pass filter the re-projected background image data 74 to determine a corresponding frame of filtered background image content 38. Thus, at least in some instances, the number of different background brightness levels indicated in filtered background image data 74 may be less than the number indicated in corresponding re-projected background image data 74.

Figure 8:
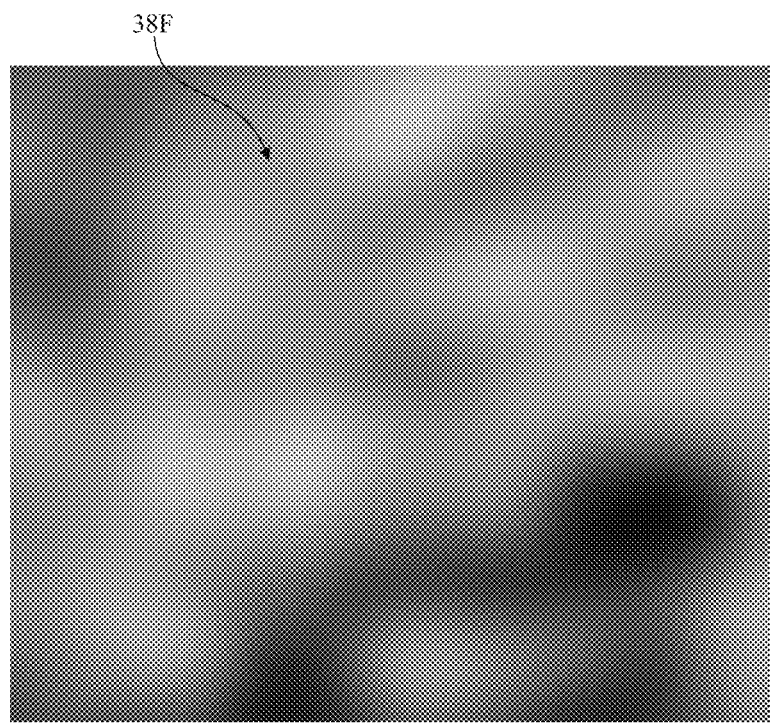
FIG. 8 is an example of a frame of filtered background image content determined by filtering the re-projected background image content of FIG. 7, in accordance with an embodiment of the present disclosure.

To help illustrate, an example of filtered background image content 38F is shown in FIG. 8. In particular, the filtered background image content 38F of FIG. 8 may result from filtering re-projected background image data 74 corresponding with the re-projected background image content 38R of FIG. 7. However, it should be appreciated that the depicted examples are merely intended to be illustrative and not limiting.

In fact, in some embodiments, filtering strength may be adaptively adjusted to balance (e.g., optimize) tradeoff between operational efficiency and perceived quality of augmented reality image content 36. For example, reducing filtering strength may result in a frame of filtered background image content 38F more closely resembling a corresponding frame of re-projected background image content 38R, which, at least in some instances, may facilitate improving the ability of tone mapping to compensate for actual optical characteristics of background image content 38. On the other hand, increasing filtering strength may facilitate reducing the number of different brightness levels (e.g., luma values) indicated in filtered background image data 74, which, at least in some instances, may reduce the number of different tone mappings applied in a frame of augmented reality image content 36.

Returning to the image processing circuitry 27 of FIG. 5, the background analysis block 72 may receive background image data 74 output from the background filtering block 70. In other words, the background analysis block 72 may receive filtered background image data 74 corresponding with a frame of filtered background image content 38F. In some embodiments, a time alignment block 76 may be communicatively coupled between the background filtering block 70 and the background analysis block 72 and, thus, filtered background image data 74 may be supplied to the time alignment block 76 before being supplied to the background analysis block 72. In particular, in some embodiments, the time alignment block 76 may be implemented and/or operated to facilitate synchronizing (e.g., time aligning) operation of the background analysis block 72 with operation of the tone mapping block 66, for example, by delaying supply of the filtered background image data 74 to the background analysis block 72.

In addition to background image data 74, as in the depicted example, the background analysis block 72 may receive an ambient lighting metric 78, which is indicative of an average (e.g., mean) brightness level (e.g., luma value) of background (e.g., ambient and/or environmental) light, output from an ambient light sensor 32. Based at least in part on the background image data 74 and the ambient lighting metric 78, the background analysis block 72 may determine a perceived background brightness metric 80, which is indicative of brightness level of background image content 38 that a user's eye 42 is expected to perceive at a pixel position corresponding with augmented reality image content 36 that is concurrently input to the tone mapping block 66.

However, in some embodiments, an electronic system 10 may be implemented and/or operated to adaptively adjust tint strength applied on one or more of its light-transmissive viewing surfaces 40. Merely as an illustrative non-limiting example, a liquid crystal (LC) layer may be implemented on a light-transmissive viewing surfaces 40, thereby enabling the electronic system 10 to control the amount of light that passes through the light-transmissive viewing surface 40 at least in part by controlling orientation of liquid crystals in the liquid crystal layer. For example, in a brighter environment, the electronic system 10 may increase tint strength applied on the light-transmissive viewing surface 40, thereby reducing the amount of light that passes through the light-transmissive viewing surface 40. Conversely, in a darker environment, the electronic system 10 may decrease tint strength applied on the light-transmissive viewing surface 40, thereby increasing the amount of light that passes through the light-transmissive viewing surface 40. In other words, tint strength applied on a light-transmissive viewing surface 40 may affect the brightness level of background image content 38 actually perceived by a user's eye 42.

To facilitate accounting (e.g., compensating) for tint strength, in some embodiments, the background analysis block 72 may additionally receive a tint strength parameter 82, which is indicative of tint strength expected to be applied on a light-transmissive viewing surface 40 while augmented reality image content 36 is being displayed. In this manner, the background analysis block 72 may determine a tint compensated perceived background brightness metric 80 based at least in part on background image data 74, an ambient lighting metric 78, and the tint strength parameter 82. For example, in some embodiments, the background analysis block 72 may determine an uncompensated perceived background brightness metric 80, which is indicative of brightness level of background image content 38 expected to be perceived by a user's eye 42 when the light-transmissive viewing surface 40 is not tinted (e.g., maximum light-transmissiveness). The background analysis block 72 may determine a tint compensated perceived background brightness metric 80 by scaling the uncompensated perceived background brightness metric 80 based on the tint strength parameter 82. For example, the background analysis block 72 may scale the uncompensated perceived background brightness metric 80 by an inverse of the tint strength parameter 82, thereby resulting in a higher (e.g., brighter) tint compensated perceived background brightness metric 80 when tint strength is weaker and a lower (e.g., darker) tint compensated perceived background brightness metric 80 when tint strength is stronger.

In addition to perceived background brightness metrics 80, in some embodiments, the background analysis block 72 may determine a local tone map grid 84 for a frame of augmented reality image content 36 based at least in part on analysis of background image content 38 on which the augmented reality image content 36 is expected to be overlaid. In particular, the local tone map grid 84 may include one or more grid zones, which are each associated with an independently controllable tone mapping. In other words, in some embodiments, the tone mapping block 66 may apply the same tone mapping at each pixel position in a grid zone, for example, while applying a different tone mapping at a pixel position in a different grid zone.

As such, efficiency with which the image processing circuitry 27 processes a frame of augmented reality image content 36 may be dependent at least in part on the number of grid zones included in a corresponding local tone map grid 84. To facilitate reducing the number of grid zones, in some embodiments, the background analysis block 72 may determine a local tone map grid 84 corresponding with a frame of augmented reality image content 36 based at least in part on analysis of filtered background image data 74 corresponding with background image content 38 over which the augmented reality image content 36 is expected to be overlaid. Additionally, to facilitate further reducing the number of number of grid zones included in a local tone map grid 84, in some embodiments, the background analysis block 72 may focus on filtered background image data 74 corresponding with an active region of a display panel 12 that will be used to display augmented reality image content 36.

Figure 9:
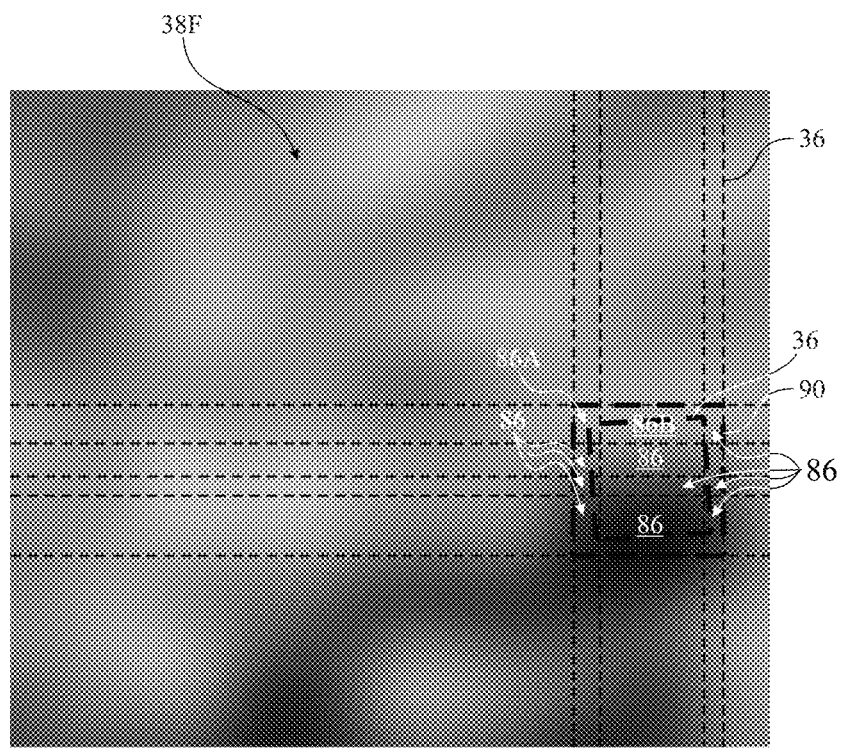
FIG. 9 is an example of a local tone map grid overlaid on the filtered background image content of FIG. 8, in accordance with an embodiment of the present disclosure.

To help illustrate, an example of a local tone map grid 84A, which is overlaid on the filtered background image content 38F of FIG. 8, is shown in FIG. 9. As depicted, the local tone map grid 84A includes multiple grid zones 86 in an active region 90 that will be used to display augmented reality image content 36 overlaid on background image content 38 corresponding with the filtered background image content 38F. In particular, as in the depicted example, adjacent pixel positions corresponding with the same filtered background brightness level (e.g., luma value) may be grouped together in a grid zone 86. For example, a first block of adjacent pixel positions that each corresponds with a first filtered background brightness level may be grouped together in a first grid zone 86A, a second block of adjacent pixel positions that each corresponds with a second filtered background brightness level may be grouped together in a second grid zone 86B, and so on.

In this manner, the local tone map grid 84A may divide the active region 90 of a display panel 12 into multiple grid zones 86, for example, which are each associated with an independently controllable tone mapping. However, it should be appreciated that the depicted example is merely intended to be illustrative and not limiting. In particular, in other embodiments, a local tone map grid 84 may be determined for an entire frame, for example, such that one or more of its grid zones 86 are outside an active region 90 of a display panel 12.

Returning to the image processing circuitry 27 of FIG. 5, in addition to the local tone map grid 84 and perceived background brightness metrics 80, the tone mapping block 66 may determine (e.g., receive) a previous augmented reality content histogram 92. In particular, the previous augmented reality content histogram 92 may indicate the number of pixel positions at each of one or more brightness levels and/or one or more brightness ranges in preceding augmented reality image content 36. As such, to facilitate appropriately tone mapping subsequent augmented reality image content 36, in some embodiments, the image processing circuitry 27 may include an augmented reality content analysis block 94 implemented and/or operated to determine a brightness histogram for augmented reality image content 36 based at least in part on analysis of corresponding display augmented reality image data 64. For example, the augmented reality content analysis block 94 may converted augmented reality image data from color component domains to a luma (e.g., achromatic) domain. The augmented reality content analysis block 94 may determine the brightness histogram (e.g., previous augmented reality content histogram 92) at least in part by counting the number of pixel positions corresponding with each of one or more luma values and/or each of one or more luma ranges.

Based at least in part on a set of operational parameters including the previous augmented reality content histogram 92, the tone mapping block 66 may apply a target tone mapping to input (e.g., source) augmented reality image data to facilitate determining display augmented reality image data 64 that accounts (e.g., compensates) for optical characteristics of background image content 38 on which corresponding augmented reality image content 36 is expected to be overlaid. To facilitate tone mapping augmented reality image content 36, in some embodiments, the tone mapping block 66 may include and/or utilize one or more tone map look-up-tables (LUTs) 96. In fact, to facilitate adaptively accounting for variations in optical characteristics of background image content 38, in some embodiments, the tone mapping block 66 may selectively apply different tone map look-up-tables to augmented reality image data associated with different sets of operational parameters.

Figure 10:
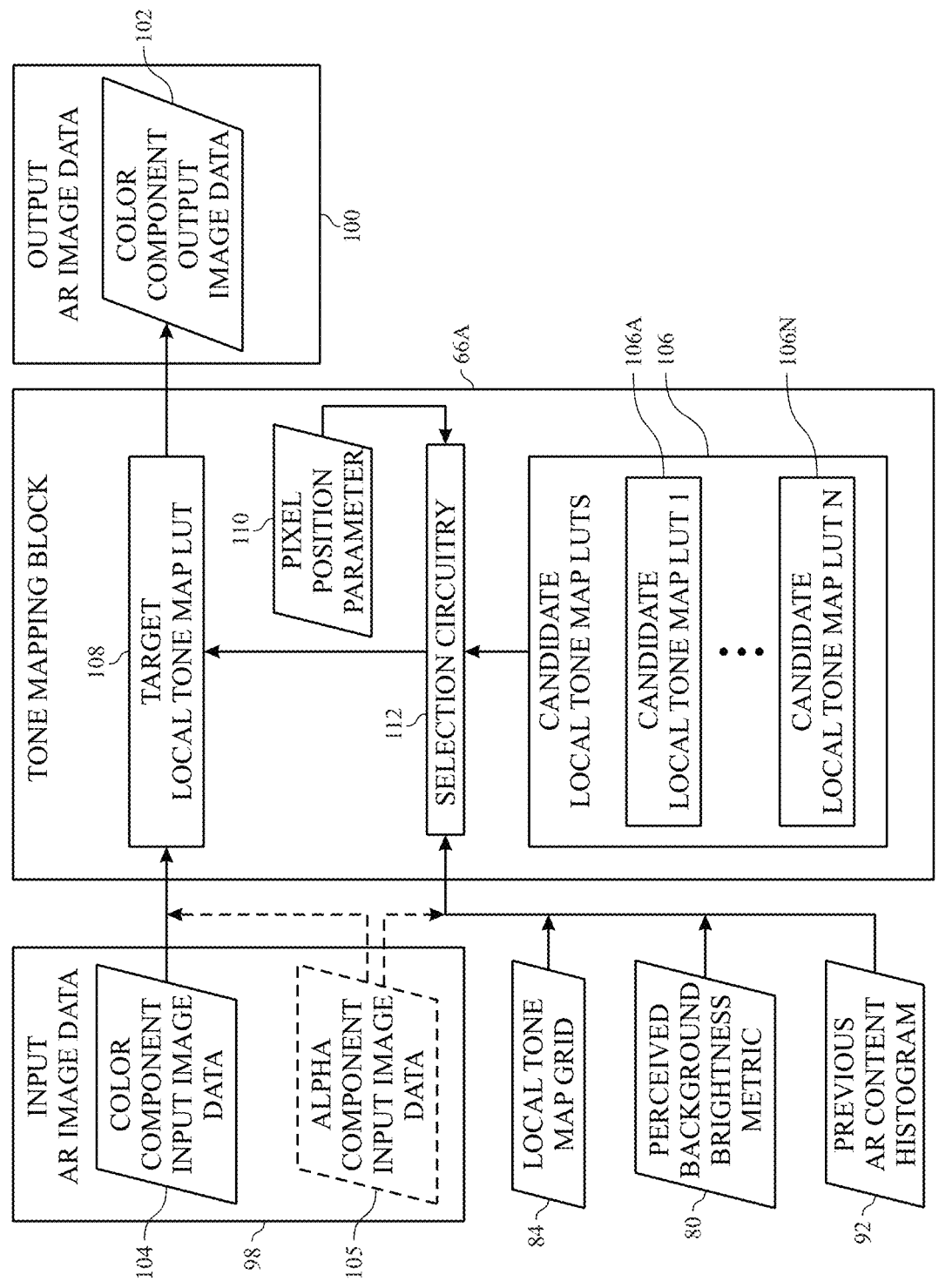
FIG. 10 is a block diagram of an example of the local tone mapping block of FIG. 5, in accordance with an embodiment of the present disclosure.

To help illustrate, an example of a tone mapping block 66A, which may be implemented in image processing circuitry 27 of an electronic system 10, is shown in FIG. 10. As depicted, the tone mapping block 66A receives input augmented reality image data 98. In some embodiments, the input augmented reality image data 98 may be source augmented reality image data 56 output from an augmented reality image source 48. In other embodiments, upstream image processing circuitry may process the source augmented reality image data 56 and supply the input augmented reality image data 98 to the tone mapping block 66A.

Additionally, as in the depicted example, the tone mapping block 66A may tone map the input augmented reality image data 98 to determine (e.g., generate) output augmented reality image data 100. In some embodiments, the output augmented reality image data 100 may be display augmented reality image data 64, which will be supplied to a display panel 12 to enable the display panel 12 to display corresponding augmented reality image content 36. In other embodiments, the output augmented reality image data 100 may be supplied to downstream image processing circuitry 27 for further processing to determine the display augmented reality image data 64.

As in the depicted example, the output augmented reality image data 100 may include color component output image data 102. For example, the output augmented reality image data 100 may include red component output image data 102, blue component output image data 102, green component output image data 102, white component output image data 102, or any combination thereof. Additionally, the input augmented reality image data 98 may include color component input image data 104. For example, the input augmented reality image data 98 may include red component input image data 104, blue component input image data 104, green component input image data 104, white component input image data 104, or any combination thereof. In some embodiments, the input augmented reality image data 98 may additionally include alpha component input image data 105, for example, which is indicative of target transparency of corresponding augmented reality image content 36.

However, it should be appreciated that the depicted example is merely intended to illustrative and not limiting. For example, in other embodiments, target transparency of augmented reality image content 36 may instead be indicated by target color component brightness levels included in the color component input image data 104 and, thus, input augmented reality image data 98 supplied to a tone mapping block 66 may not include alpha component input image data 105. Additionally or alternatively, the output augmented reality image data 100 may include alpha component output image data.

As described above, to facilitate improving augmented reality experience, a tone mapping block 66 (e.g., image processing circuitry 27) may adaptively adjust tone mapping applied to augmented reality image content 36, for example, such that the tone mapping block 66 applies different tone mappings to different portions of a frame of the augmented reality image content 36. Additionally, as described above, a tone mapping block 66 may include and/or utilize one or more tone map look-up-tables (LUTs) 88. In fact, to facilitate adaptively adjusting tone mapping, as in the depicted example, the tone mapping block 66A may include and/or have access to multiple candidate local tone map look-up-tables (LUTs) 106.

In some embodiments, each of the candidate local tone map look-up-tables (LUTs) 106 may be associated with a different set of operational parameters. For example, a first candidate local tone map look-up-table 106A may be associated with a first set of operational parameters, an Nth candidate local tone map look-up-table 106A may be associated with an Nth set of operational parameters, and so on. Additionally, in some embodiments, each set of operational parameters may include one or more operational parameters that potentially affect visual perception of augmented reality image content 36. For example, a set of operational parameters associated with input augmented reality image data 98 may include a perceived background brightness metric 80, which is indicative of brightness level of background image content 38 expected to be perceived by a user 34 through a light-transmissive viewing surface 40, and a previous augmented reality content histogram 92, which is indicative of brightness level in preceding augmented reality image content 36.

Additionally or alternatively, a set of operational parameters associated with input augmented reality image data 98 may be indicative of a grid zone 86 that includes a corresponding pixel position. As described above, a grid zone 86 in a local tone map grid 84 may group together pixel positions associated with the same perceived background brightness metric 80. Thus, in some embodiments, a set of operational parameters associated with input augmented reality image data 98 may include a pixel position parameter 110, which identifies a pixel position associated with the input augmented reality image data 98. By analyzing the pixel position corresponding with the input augmented reality image data 98 in view of the local tone map grid 84, in such embodiments, the tone mapping block 66A may identify the grid zone 86 including the pixel position and, thus, an associated perceived background brightness metric 80.

As such, to facilitate appropriately tone mapping input augmented reality image data 98, the tone mapping block 66A may select a candidate local tone map look-up-table 106 corresponding with an associated set of operational parameters as a target local tone map look-up-table 106, which will be used to tone map color component input image data 104 included in the input augmented reality image data 98 into color component output image data 102 to be included in the output augmented reality image data 100. In particular, in some embodiments, the target local tone map look-up-table 108 may map an input color component brightness (e.g., grayscale) level indicated in color component input image data 104 to an output color component brightness level indicated in corresponding color component output image data 102. For example, using the target local tone map look-up-table 108, the tone mapping block 66A may map a red component input brightness level to a red component output brightness level, a blue component input brightness level to a blue component output brightness level, a green component input brightness level to a green component output brightness level, a white component input brightness level to a white component output brightness level, or any combination thereof.

To facilitate selecting a target local tone map look-up-table 108 from the candidate local tone map look-up-tables 106, as in the depicted example, the tone mapping block 66A may include selection circuitry 112. In particular, in some embodiments, the selection circuitry 112 may operate to determine a set of operational parameters associated with input augmented reality image data 98 and select a candidate local tone map look-up-table 106 associated with the set of operational parameters as the target local tone map look-up-table 108. For example, the selection circuitry 112 may determine (e.g., receive) a set of operational parameters including a pixel position parameter 110, which identifies a pixel position associated with the input augmented reality image data 98, a local tone map grid 84 for a frame of corresponding augmented reality image content 36, a perceived background brightness metric 80 associated with the pixel position, alpha component input image data 105, which is indicative of target transparency of corresponding augmented reality image content 36, a previous augmented reality content histogram 92, which is indicative of brightness level in a preceding augmented reality image content 36, or any combination thereof.

By implementing a tone mapping block 66 in image processing circuitry 27 of an electronic system 10 in this manner, the image processing circuitry 27 operate to adaptively vary tone mapping applied at different pixel positions in a frame of augmented reality image content 36 and/or in different (e.g., successive) frames of augmented reality image content 36. For example, as described above, the image processing circuitry 27 may apply different tone mappings to account (e.g., compensate) for different brightness levels in background image content 38. As described above, at least in some instances, adaptively varying tone mapping in this manner may facilitate improving perceived quality of augmented reality image content 36 presented by the electronic system 10 and, thus, an augmented reality experience provided by the electronic system 10, for example, by enabling a stronger tone mapping to be applied to augmented reality image content 36 that is expected to be overlaid on brighter background image content 38, thereby boosting contrast of the augmented reality image content 36 compared to when the augmented reality image content 36 is expected to be overlaid on darker background image content 38.

Figure 11:
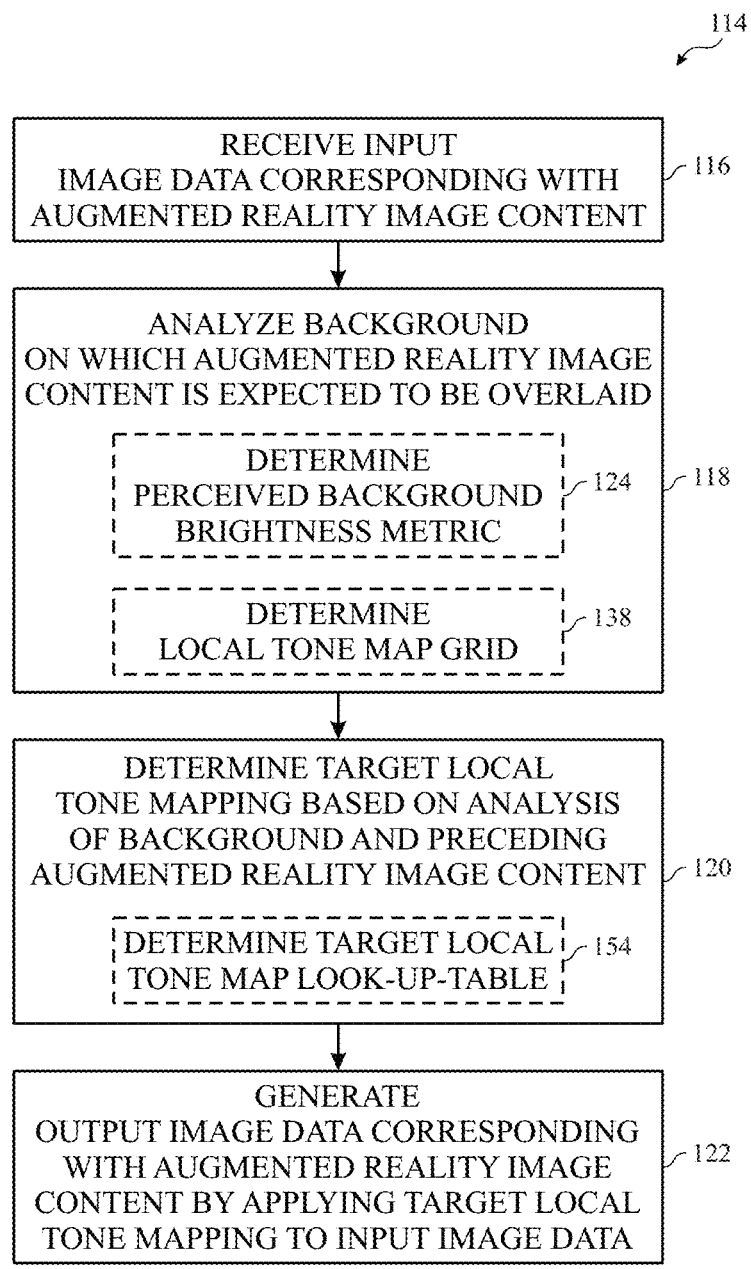
FIG. 11 is a flow diagram of an example process for operating the image processing circuitry of FIG. 5, in accordance with an embodiment of the present disclosure.

To help further illustrate, an example of a process 114 for operating image processing circuitry, which may be implemented in an electronic system 10, is described in FIG. 11. Generally, the process 114 includes receiving input image data corresponding with augmented reality image content (process block 116) and analyzing a background on which the augmented reality image content is expected to be overlaid (process block 118). Additionally, the process 114 includes determining a target local tone mapping based at least in part on the analysis of the background and preceding augmented reality image content (process block 120) and generating output image data corresponding with the augmented reality image content by applying the target local tone mapping to the input image data (process block 122).

Although described in a particular order, which represents a particular embodiment, it should be noted that the process 114 may be performed in any suitable order. Additionally, embodiments of the process 114 may omit process blocks and/or include additional process blocks. Moreover, in some embodiments, the process 114 may be implemented at least in part by circuit connections formed (e.g., programmed) in image processing circuitry 27. Additionally or alternatively, the process 114 may be implemented at least in part by executing instructions stored in a tangible, non-transitory, computer-readable medium, such as controller memory 54, using processing circuitry, such as a controller processor 52.

Accordingly, in some embodiments, a controller 50 may instruct image processing circuitry 27 implemented in an electronic system 10 to determine input augmented reality image data 98, which is to be supplied to a tone mapping block 66 implemented therein (process block 116). As described above, in some embodiments, the input augmented reality image data 98 may be source augmented reality image data 56 and, thus, output and/or received from an augmented reality image source 48. In other embodiments, upstream image processing circuitry 27 may process the source augmented reality image data 56 to determine the input augmented reality image data 98 supplied to the tone mapping block 66.

Additionally, the controller 50 may instruct a background analysis block 72 implemented in the image processing circuitry 27 to analyze a background on which augmented reality image content 36 corresponding with the input augmented reality image data 98 is expected to be overlaid (process block 118). As described above, the background analysis block 72 may analyze the background to determine expected optical characteristics, such as color and/or brightness level, of a frame of background image content 38. In particular, in some embodiments, the background analysis block 72 may analyze the background to determine a perceived background brightness metric 80, which is indicative of brightness level of background image content 38 expected to be perceived at a pixel position corresponding with the input augmented reality image data 98 (process block 124).

Figure 12:
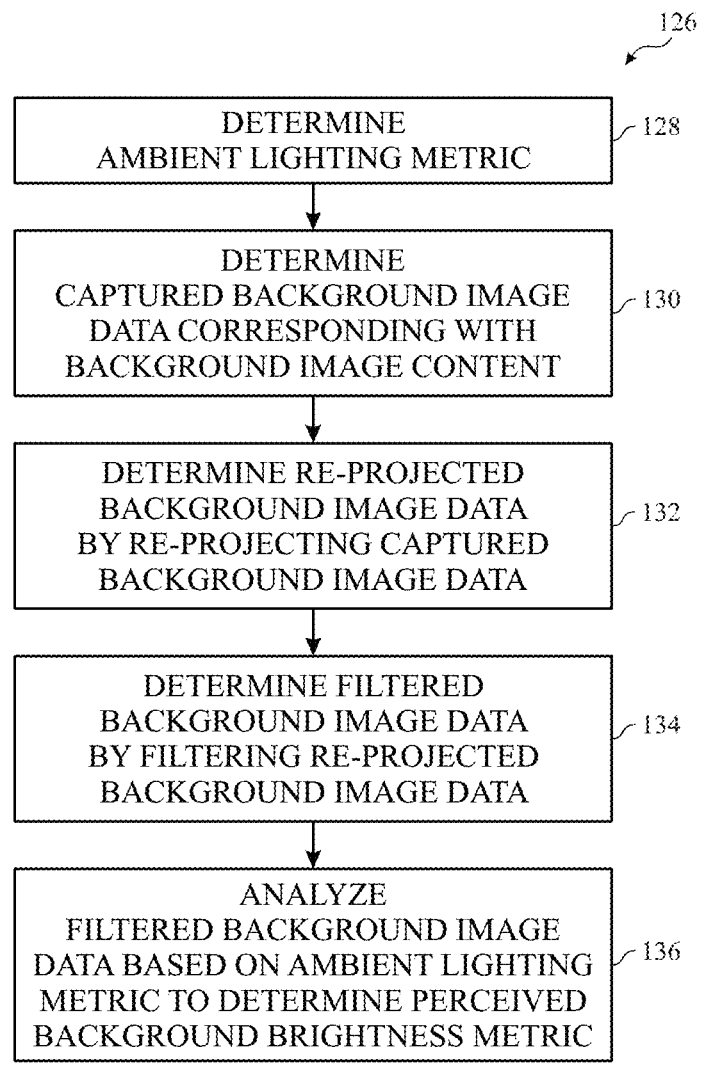
FIG. 12 is a flow diagram of an example process for analyzing a background on which augmented reality image content is expected to be overlaid to determine a perceived background brightness metric, in accordance with an embodiment of the present disclosure.

To help illustrate, an example of a process 126 for operating image processing circuitry 27, which may be implemented in an electronic system 10, to determine a perceived background brightness metric 80 is described in FIG. 12. Generally, the process 126 includes determining an ambient lighting metric (process block 128) and determining captured background image data corresponding with background image content (process block 130). Additionally, the process 126 includes determining re-projected background image data by re-projecting the captured background image data (process block 132), determining filtered background image data by filtering the re-projected background image data (process block 134), and analyzing the filtered background image data based on the ambient lighting metric to determine a perceived background brightness metric (process block 136).

Although described in a particular order, which represents a particular embodiment, it should be noted that the process 126 may be performed in any suitable order. Additionally, embodiments of the process 126 may omit process blocks and/or include additional process blocks. Moreover, in some embodiments, the process 126 may be implemented at least in part by circuit connections formed (e.g., programmed) in image processing circuitry 27. Additionally or alternatively, the process 126 may be implemented at least in part by executing instructions stored in a tangible, non-transitory, computer-readable medium, such as controller memory 54, using processing circuitry, such as a controller processor 52.

Accordingly, in some embodiments, a controller 50 may instruct a background analysis block 72 implemented in image processing circuitry 27 of an electronic system 10 to determine an ambient lighting metric 78, which is indicative of an average (e.g., mean) brightness level (e.g., luma value) of background light, for example, spatially averaged over an image frame and/or temporally averaged over multiple (e.g., successively) image frames (process block 128). As described above, in some embodiments, an ambient lighting metric 78 may be determined (e.g., measured and/or output) by an ambient light sensor 32. Thus, in such embodiments, the background analysis block 72 may receive the ambient light metric 78 output from the ambient light sensor 32.

Additionally, the controller 50 may instruct the image processing circuitry 27 to determine captured background image data 74 corresponding with a frame of background image content 38 (process block 130). As described above, in some embodiments, an image sensor 30 may capture background image content 38 by generating captured background image data 74, which indicate color component brightness levels at one or more locations (e.g., points and/or image pixels) in background image content 38. Thus, in such embodiments, the image processing circuitry 27 may receive the captured background image data 74 output from the image sensor 30.

In some embodiments, the electronic system 10 may convert background image data 74 from a color component domain to a luma domain before subsequent processing by its image processing circuitry 27. In other words, in such embodiments, the electronic system 10 may combine multiple color component brightness (e.g., grayscale) levels indicated in the background image data 74 (e.g., after weighting) to determine a corresponding luma value. For example, when captured using a red-green-blue (RGB) color space, the electronic system 10 may determine the luma value as a sum of a red component brightness level scaled (e.g., multiplied) by a first coefficient, a blue component brightness level scaled by a second coefficient, and a green component brightness level scaled by a third coefficient. In other embodiments, the background image data 74 may be captured using a different color space, such as an International Commission on Illumination (CIE) XYZ color space, an International Commission on Illumination (CIE) L*a*b* color space, or an IPT color space, and converted to a corresponding luma value.

Furthermore, the controller 50 may instruct a background re-projection block 68 implemented in the image processing circuitry 27 to determine re-projected background image data 74 by processing the captured background image data 74 to re-project the captured background image content 38C from the perspective of the image sensor 30 to the expected perspective of a user's eye 42 (process block 132). As described above, in some embodiments, the background re-projection block 68 may re-project captured background image content 38C at least in part by cropping and/or resizing the captured background image content 38 to determine re-projected background image content 38R that is expected to be viewed through a light-transmissive viewing surface 40 of the electronic system 10. Additionally, as described above, in some embodiments, the background re-projection block 68 may determine multiple versions of re-projected background image content 38R, for example, to facilitate accounting for spatial offset between a first eye 42A of the user 34 and a second eye 42B of the user 34.

The controller 50 may instruct a background filtering block 70 implemented in the image processing circuitry 27 to determine filtered background image data 74 by filtering the re-projected background image data 74 output from the background re-projection block 68 (process block 134). As described above, in some embodiments, the background filtering block 70 may low pass filter the re-projected background image data 74 corresponding with a frame of re-projected background image content 38R to determine corresponding filtered background image data 74. In other words, at least in some such embodiments, filtering multiple different background brightness levels (e.g., luma values) indicated in re-projected background image data 74 may result (e.g., rounded to) in the same filtered background brightness level. Thus, at least in such embodiments, the number of different brightness levels indicated in filtered background image content 38F may be less than the number indicated in corresponding re-projected background image content 38R.

Additionally, the controller 50 may instruct the background analysis block 72 to determine a perceived background brightness metric 80 based at least in part on the filtered background image data 74 and the ambient lighting metric 78 (process block 136). As described above, a perceived background brightness metric 80 may be indicative of background brightness expected to be perceived through a light-transmissive viewing surface 40 of the electronic system 10. However, as described above, in some embodiments, an electronic system 10 may adaptively adjust tint strength applied on one or more of its light-transmissive viewing surfaces 40, which, at least in some instances, may affect the background brightness actually perceived by a user 34.

To facilitate accounting for tint strength, in some embodiments, the background analysis block 72 may determine an uncompensated perceived background brightness metric 80 based on the filtered background image data 74 and the ambient lighting metric 78. The background analysis block 72 may determine a tint compensated perceived background brightness metric 80 by scaling the uncompensated perceived background brightness metric 80 based on a tint strength parameter 82, which is indicative of tint strength expected to be applied on a light-transmissive viewing surface 40 of the electronic system 10. For example, the background analysis block 72 may scale the uncompensated perceived background brightness metric 80 by an inverse of the tint strength parameter 82, thereby resulting in a higher (e.g., brighter) tint compensated perceived background brightness metric 80 when tint strength is weaker and a smaller (e.g., darker) tint compensated perceived background brightness metric 80 when tint strength is stronger.

In this manner, image processing circuitry 27 implemented in an electronic system 10 may operate to determine one or more perceived background brightness metrics 80 based at least in part on analysis of expected background (e.g., real) optical characteristics. Returning to the process 114 of FIG. 11, as described above, in some embodiments, the electronic system 10 may additionally determine a local tone map grid 84 for a frame of augmented reality image content 36 based at least in part on analysis of the background over which the augmented reality image content 36 is expected to be overlaid (process block 138). For example, as described above, a local tone map grid 84 may be set such that each of its grid zones 86 groups together pixel positions associated with approximately the same background optical characteristics.

Figure 13:
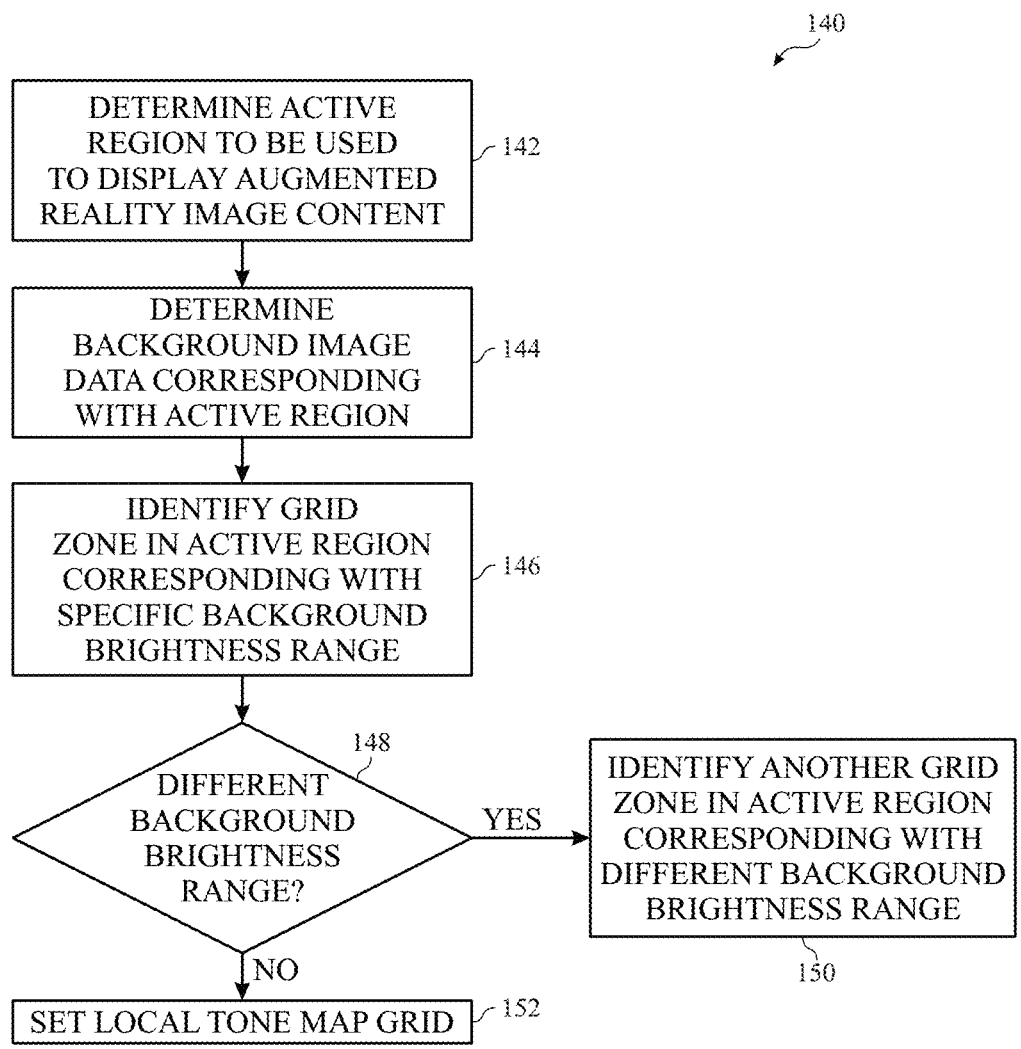
FIG. 13 is a flow diagram of an example process for analyzing a background on which augmented reality image content is expected to be overlaid to determine a local tone map grid, in accordance with an embodiment of the present disclosure.

To help further illustrate, an example of a process 140 for determining a local tone map grid 84 is described in FIG. 13. Generally, the process 140 includes determining an active region to be used to display augmented reality image content (process block 142), determining background image data corresponding with the active region (process block 144), and identifying a grid zone in the active region corresponding with a specific background brightness range (process block 146). Additionally, the process 140 includes determining whether a different background brightness range is present in the active region (decision block 148), identifying another grid zone in the active region corresponding with the different background brightness range when the different background brightness range is present in the active region (process block 150), and setting a local tone map grid when a different background brightness range is not present in the active region (process block 152).

Although described in a particular order, which represents a particular embodiment, it should be noted that the process 140 may be performed in any suitable order. Additionally, embodiments of the process 140 may omit process blocks and/or include additional process blocks. Moreover, in some embodiments, the process 140 may be implemented at least in part by circuit connections formed (e.g., programmed) in image processing circuitry 27. Additionally or alternatively, the process 140 may be implemented at least in part by executing instructions stored in a tangible, non-transitory, computer-readable medium, such as controller memory 54, using processing circuitry, such as a controller processor 52.

Accordingly, in some embodiments, a controller 50 may instruct a background analysis block 72 implemented in image processing circuitry 27 of an electronic system 10 to determine (e.g., identify) an active region 90 of a display panel 12 that will be used to display augmented reality image content 36 (process block 142). In particular, as described above, the active region 90 may at least include each pixel position corresponding with a display pixel 58 that emits light to display the augmented reality image content 36. Additionally, as described above, a display panel 12 may control light emission from its display pixels 58 based at least in part on one or more target color component brightness levels indicated in corresponding image data.

As such, to facilitate identifying the active region 90, in some embodiments, the background analysis block 72 may analyze augmented reality image data corresponding with the augmented reality image content 36. For example, the background analysis block 72 may determine that a pixel position will not be used to actively display augmented reality image content 36 when each target color component brightness level indicated in corresponding augmented reality image data is zero. On the other hand, the background analysis block 72 may determine that a pixel position will actively be used to display augmented reality image content 36 when one or more target color component brightness levels is non-zero and, thus, should be included in the active region 90. Nevertheless, to facilitate improving operational and/or computational efficiency, in some embodiments, the background analysis block 72 may determine the active region 90 with a rectangular shape and, thus, the active region 90 in a frame may include one or more pixel positions that do not actively display augmented reality image content 36.

Additionally, the controller 50 may instruct the background analysis block 72 to determine background image data 74 corresponding with background image content 38 over which the active region 90 is expected to be overlaid (process block 144). As described above, in some embodiments, the background analysis block 72 may analyze filtered background image data 74 corresponding with the background image content 38. Accordingly, in such embodiments, the background analysis block 72 may identify filtered background image data 74 corresponding with each pixel position included in the active region 90.

Furthermore, the controller 50 may instruct the background analysis block 72 to identify a grid zone 86 corresponding with a specific background brightness range in the active region 90 (process block 146). As described above, in some embodiments, filtering multiple different captured background brightness levels (e.g., luma values) may result in the same filtered background brightness level. In other words, in such embodiments, each filtered background brightness level (e.g., luma value) indicated in the filtered background image data 74 may correspond with a different range of captured background brightness levels.

Additionally, as described above, a grid zone 86 may group together pixel positions associated with approximately the same background optical characteristics. Thus, in some embodiments, the background analysis block 72 may group together adjacent pixel positions associated with the same filtered background brightness level in a grid zone 86. However, to facilitate improving operational and/or computational efficiency, in some embodiments, the background analysis block 72 may identify each grid zone 86 with a rectangular shape, which, at least in some instances, may result in adjacent pixel positions associated with the same filtered background brightness level nevertheless being included in different grid zones 86.

The controller 50 may instruct the background analysis block 72 to determine whether a pixel position in the active region 90 is associated with a different background brightness range (decision block 148). In other words, in some embodiments, the background analysis block 72 may determine whether a pixel position in the active region 90 is associated with a different filtered background brightness level. When a different background brightness range is present, the controller 50 may instruct the background analysis block 72 to identify another grid zone 86 in the active region 90 corresponding with the different background brightness range (process block 150). In other words, in some embodiments, the background analysis block 72 may identify another grid zone 86 in the active region 90 corresponding with the different filtered background brightness level.

On the other hand, once a grid zone 86 has been identified for each background brightness range in the active region 90, the controller 50 may instruct the background analysis block 72 to set (e.g., finalize) the local tone map grid 84 for a frame including the augmented reality image content 36 (process block 152). In some embodiments, the background analysis block 72 may set the local tone map grid 84 by identifying pixel positions on a display panel 12 included in each of its grid zones 86. As such, based at least in part on a pixel position corresponding with augmented reality image data, in some embodiments, image processing circuitry 27 may identify a grid zone 86 in which corresponding augmented reality image content 36 will be displayed.

Returning to the process 114 of FIG. 11, based at least in part on analysis of the background and preceding augmented reality image content 36, the tone mapping block 66 implemented in the image processing circuitry 27 may determine a target local tone mapping to be applied to the input augmented reality image data 98 (process block 120). As described above, in some embodiments, the tone mapping block 66 may perform tone mapping using one or more tone map look-up-tables 88. Accordingly, to facilitate applying the appropriate local tone mapping, in some embodiments, the tone mapping block 66 may determine a target local tone map look-up-table 108, for example, selected from multiple candidate local tone map look-up-tables 106 based at least in part on the analysis of the background and the preceding augmented reality image content 36.

Figure 14:
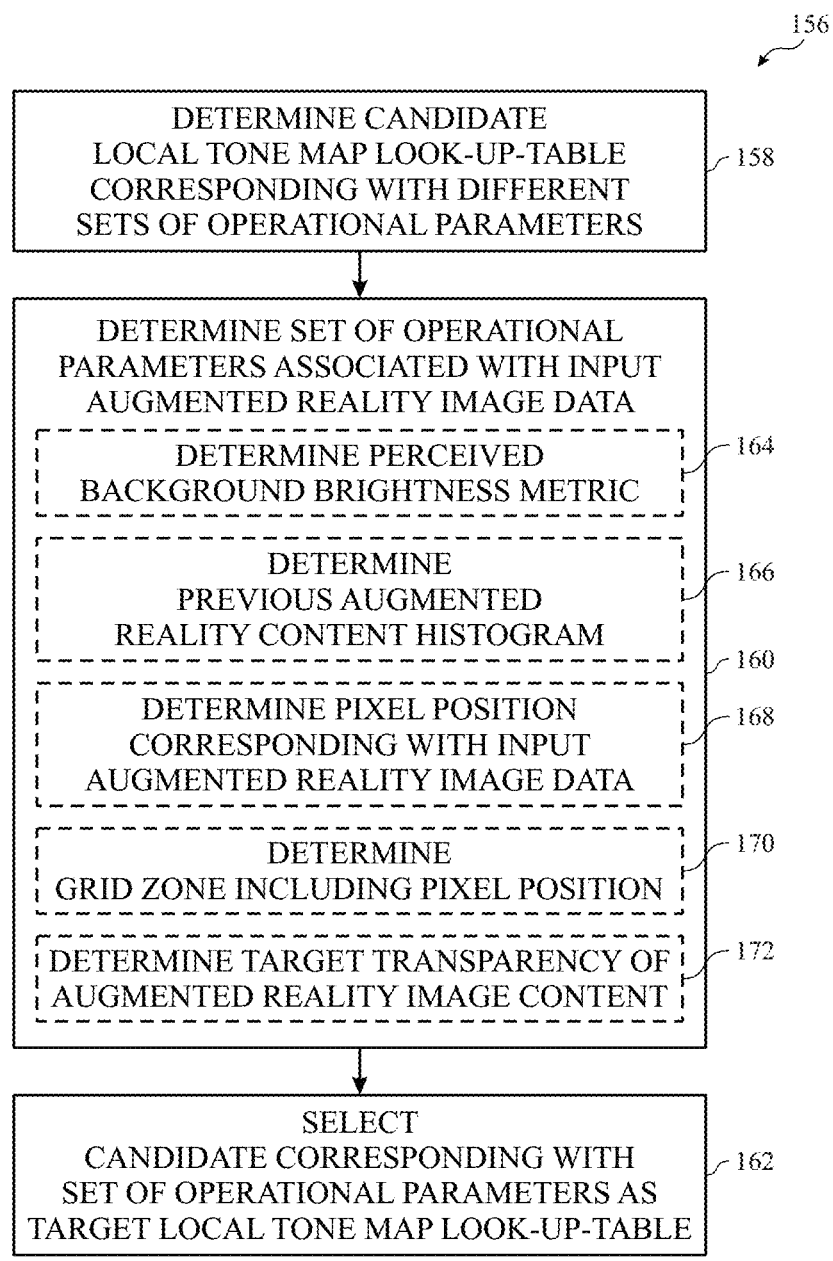
FIG. 14 is an example of a process for determining a target local tone mapping to be applied to augmented reality image data corresponding with augmented reality image content, in accordance with an embodiment of the present disclosure.

To help further illustrate, an example of a process 156 for determining a target local tone map look-up-table 108 is described in FIG. 14. Generally, the process 156 includes determining candidate local tone map look-up-tables corresponding with different sets of operational parameters (process block 158), determining a set of operational parameters associated with input augmented reality image data (process block 160), and selecting a candidate local tone map look-up-table corresponding with the set of operational parameters as a target local tone map look-up-table (process block 162).

Although described in a particular order, which represents a particular embodiment, it should be noted that the process 156 may be performed in any suitable order. Additionally, embodiments of the process 156 may omit process blocks and/or include additional process blocks. Moreover, in some embodiments, the process 156 may be implemented at least in part by circuit connections formed (e.g., programmed) in image processing circuitry 27. Additionally or alternatively, the process 156 may be implemented at least in part by executing instructions stored in a tangible, non-transitory, computer-readable medium, such as controller memory 54, using processing circuitry, such as a controller processor 52.

Accordingly, in some embodiments, a controller 50 may instruct a tone mapping block 66 implemented in image processing circuitry 27 of an electronic system 10 to determine multiple different candidate local tone map look-up-tables 106 (process block 158). As described above, in some embodiments, each of the different candidate local tone map look-up-tables 106 may be associated with a different set of operational parameters. Additionally, the controller 50 may instruct the tone mapping block 66 to determine a set of operational parameters associated with input augmented reality image data 98 (process block 160).

As described above, in some embodiments, a set of operational parameters associated with augmented reality image data may include one or more operational parameters that potentially affect visual perception of corresponding augmented reality image content 36. Thus, in some embodiments, determining the set of operational parameters associated with input augmented reality image data 98 may include determining a (e.g., tint compensated) perceived background brightness metric 80 associated with a pixel position corresponding with the input augmented reality image data 98 (process block 164) and determining a previous augmented reality content histogram 92 (process block 166). As described above, in some embodiments, the tone mapping block 66 may receive the perceived background brightness metric 80 from a background analysis block 72 implemented in the image processing circuitry 27.

Additionally, as described above, a local tone map grid 84 corresponding with a frame of augmented reality image content 36 may identify the pixel positions on a display panel 12 that are included in each of its grid zones 86. Furthermore, as described above, in some embodiments, each grid zone 86 in a local tone map grid 84 may be associated with a specific set of operational parameters, for example, including a specific perceived background brightness metric 80 associated with each pixel position included therein. Thus, in some embodiments, determining the set of operational parameters associated with the input augmented reality image data 98 may additionally or alternatively include determining (e.g., identifying) a pixel position corresponding with the input augmented reality image data 98 (process block 168) and determining (e.g., identifying) a grid zone 86 that includes the pixel position (process block 170).

As described above, in some embodiments, the electronic system 10 (e.g., image processing circuitry 27 and/or tone mapping block 66) may determine the pixel position corresponding with input augmented reality image data 98 based at least in part on its processing order relative to other augmented reality image data in the same frame, for example, in view of pixel dimensions a display panel 12 and/or an active region 90 of the display panel 12 that will be used to display the frame of augmented reality image content 36. Additionally, as described above, by analyzing the pixel position in view of a local tone map grid 84 corresponding with the frame of augmented reality image content 36, the tone mapping block 66 may identify the grid zone 86 corresponding with the input augmented reality image data 98. In this manner, the tone mapping block 66 may determine a set of operational parameters associated with each pixel position in the grid zone 86 and, thus, the input augmented reality image data 98.

Furthermore, in some embodiments, determining the set of operational parameters associated with the input augmented reality image data 98 may additionally or alternatively include determining target transparency of corresponding augmented reality image content 36 (process block 172). As described above, in some embodiments, the tone mapping block 66 may determine the target transparency of the corresponding augmented reality image content 36 based on alpha component input image data 105 included in the input augmented reality image data 98. Additionally or alternatively, the tone mapping block 66 may determine the target transparency of the corresponding augmented reality image content 36 based on target color component brightness (e.g., grayscale) levels indicated in the input augmented reality image data 98.

Based on the associated set of operational parameters, the tone mapping block 66 may select a target local tone map look-up-table 108 from the multiple candidate local tone map look-up-tables 106 (process block 162). For example, the tone mapping block 66 may select a first candidate local tone map look-up-table 106A as the target local tone map look-up-table 108 when the input augmented reality image data 98 is associated with a first set of operational parameters, an Nth candidate local tone map look-up-table 106N as the target local tone map look-up-table 108 when the input augmented reality image data 98 is associated with a second set of operational parameters, and so on. In this manner, a tone mapping block 66 implemented in image processing circuitry of an electronic system 10 may operate to adaptively determine a target tone mapping to be applied to input augmented reality image data 98.

Returning to the process 114 of FIG. 11, the controller 50 may instruct the tone mapping block 66 to apply the target local tone mapping to the input augmented reality image data 98 to determine (e.g., generate and/or output) output augmented reality image data 100 (process block 122). For example, using the target local tone map look-up-table 108, the tone mapping block 66 may map a target red component brightness level indicated in the input augmented reality image data 98 to a target red component brightness level to be indicated in the output augmented reality image data 100, a target blue component brightness level indicated in the input augmented reality image data 98 to a target blue component brightness level to be indicated in the output augmented reality image data 100, and/or a target green component brightness level indicated in the input augmented reality image data 98 to a target green component brightness level to be indicated in the output augmented reality image data 100. In some embodiments, using the target local tone map look-up-table 108, the tone mapping block 66 may additionally or alternatively map a target white component brightness level indicated in the input augmented reality image data 98 to a target white component brightness level to be indicated in the output augmented reality image data 100.

As described above, in some embodiments, the output augmented reality image data 100 may be display augmented reality image data 64, which is supplied to a display panel 12 to enable the display panel 12 to present (e.g., display) corresponding augmented reality image content 36. In other embodiments, the output augmented reality image data may be further processed by downstream image processing circuitry 27 to determine the display augmented reality image data 64. Moreover, as described above, in some embodiments, downstream image processing circuitry 27 (e.g., augmented reality content analysis block 94) may analyze the display augmented reality image data 64 to determine a previous augmented reality content histogram 92, which will be used during tone mapping of subsequent augmented reality image content 36. In this manner, the techniques described in the present disclosure may enable an electronic system 10 to adaptively adjusting tone mapping applied to augmented reality image content 36 based at least in part on expected background optical characteristics, which, at least in some instances, may facilitate improving perceived quality of the augmented reality image content 36 and, thus, an augmented reality experience provided by the electronic system 10.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic system comprising:
   a display panel implemented on a light-transmissive viewing surface of the electronic system, wherein the display panel is configured to display a frame of augmented reality image content such that the augmented reality image content is perceived as being overlaid on background image content viewed through the light-transmissive viewing surface and adaptively adjust tint strength applied on the light-transmissive viewing surface; and
   image processing circuitry communicatively coupled to the display panel, wherein the image processing circuitry is configured to:
      receive first input augmented reality image data corresponding with a first pixel position on the display panel;
      determine an uncompensated perceived background brightness metric indicative of brightness level of the background image content expected to be perceived at the first pixel position on the display panel when the light-transmissive viewing surface is not tinted;
      determine a first perceived background brightness metric indicative of a brightness level of the background image content expected to be perceived at the first pixel position on the display panel during display of the augmented reality image content based at least in part on captured background image data output from an image sensor and an ambient lighting metric output from an ambient light sensor and based at least in part on the tint strength expected to be applied on the light-transmissive viewing surface while the display panel is displaying the frame of augmented reality image content, wherein the first perceived background brightness metric is determined at least in part by scaling the uncompensated perceived background brightness metric based on a tint strength expected to be applied on the light-transmissive viewing surface;
      determine a first target tone mapping to be applied to the first input augmented reality image data based at least in part on the first perceived background brightness metric associated with the first input augmented reality image data; and
      determine display augmented reality image data to be used by the display panel to display the augmented reality image content at least in part by applying the first target tone mapping to the first input augmented reality image data.

2. The electronic system of claim 1, wherein the image processing circuitry is configured to:
   receive second input augmented reality image data corresponding with a second pixel position different from the first pixel position on the display panel;
   determine a second perceived background brightness metric indicative of brightness level of the background image content expected to be perceived at the second pixel position on the display panel during display of the augmented reality image content based at least in part on the captured background image data output from the image sensor and the ambient lighting metric output from the ambient light sensor;
   determine a second target tone mapping different from the first target tone mapping to be applied to the second input augmented reality image data based at least in part on the second perceived background brightness metric associated with the second input augmented reality image data; and
   determine the display augmented reality image data to be used by the display panel to display the augmented reality image content at least in part by applying the second target tone mapping to the second input augmented reality image data.

3. The electronic system of claim 2, wherein:
   the first target tone mapping applied to the first input augmented reality image data corresponding with the first pixel position is stronger than the second target tone mapping applied to the second input augmented reality image data corresponding with the second pixel position when the first perceived background brightness metric associated with the first pixel position is greater than the second perceived background brightness metric associated with the second pixel position; the first target tone mapping applied to the first input augmented reality image data corresponding with the first pixel position is weaker than the second target tone mapping applied to the second input augmented reality image data corresponding with the second pixel position when the first perceived background brightness metric associated with the first pixel position is less than the second perceived background brightness metric associated with the second pixel position; or both.

4. The electronic system of claim 1, wherein the image processing circuitry is configured to:
  determine a previous augmented reality content histogram indicative of brightness level of a preceding frame of augmented reality image content; and
  determine the first target tone mapping to be applied to the first input augmented reality image data based at least in part on the previous augmented reality content histogram.

5. The electronic system of claim 4, wherein the first target tone mapping to be applied to the first input augmented reality image data is:
  stronger when the previous augmented reality content histogram indicates that the preceding frame of augmented reality image content is brighter;
  weaker when the previous augmented reality content histogram indicates that the preceding frame of augmented reality image content is darker; or
  both.

6. The electronic system of claim 1, wherein the first target tone mapping to be applied to the first input augmented reality image data is:
  stronger when the tint strength expected to be applied on the light-transmissive viewing surface is weaker;
  weaker when the tint strength expected to be applied on the light-transmissive viewing surface is stronger; or
  both.

7. The electronic system of claim 1, comprising an augmented reality image source communicatively to the image processing circuitry, wherein:
  the augmented reality image source is configured to output source augmented reality image data corresponding with the frame of augmented reality image content; and
  the image processing circuitry is configured to process the source augmented reality image data to determine the first input augmented reality image data corresponding with the first pixel position in the frame of augmented reality image content.

8. The electronic system of claim 1, wherein:
  the electronic system comprises a head-up display system configured to be deployed in an automotive vehicle; and
  the light-transmissive viewing surface comprises at least a portion of a windshield of the automotive vehicle.

9. The electronic system of claim 1, wherein the electronic system comprises an augmented reality headset system, a mixed reality headset system, or augmented reality glasses.

10. The electronic system of claim 1, wherein the image processing circuitry is configured to re-project the background image data to spatially relocate the background image data.

11. An electronic system comprising:
  a display panel implemented on a light-transmissive viewing surface of the electronic system, wherein the display panel is configured to display a frame of augmented reality image content such that the augmented reality image content is perceived as being overlaid on background image content viewed through the light-transmissive viewing surface; and
  image processing circuitry communicatively coupled to the display panel, wherein the image processing circuitry is configured to:
    receive first input augmented reality image data corresponding with a first pixel position on the display panel;
    determine first re-projected background image data at least in part by processing the captured background image data output from the image sensor to re-project a captured frame of the background image content from a perspective of the image sensor to an expected perspective of a user's first eye provided by the light-transmissive viewing surface of the electronic system;
    determine first filtered background image data at least in part by low pass filtering the first re-projected background image data;
    determine a first perceived background brightness metric indicative of a brightness level of the background image content expected to be perceived at the first pixel position on the display panel during display of the augmented reality image content based at least in part on the first filtered background image data corresponding with the first pixel position on the display panel and an ambient lighting metric output from an ambient light sensor;
    determine a first target tone mapping to be applied to the first input augmented reality image data based at least in part on the first perceived background brightness metric associated with the first input augmented reality image data; and
    determine display augmented reality image data to be used by the display panel to display the augmented reality image content at least in part by applying the first target tone mapping to the first input augmented reality image data.

12. The electronic system of claim 11, comprising another display panel implemented on another light-transmissive viewing surface of the electronic system, wherein:
  the other display panel is configured to display the frame of augmented reality image content such that the augmented reality image content is perceived as being overlaid on the background image content viewed through the other light-transmissive viewing surface; and
  the image processing circuitry is configured to:
    receive second input augmented reality image data corresponding with a second pixel position on the other display panel;
    determine second re-projected background image data at least in part by processing the captured background image data output from the image sensor to re-project the captured frame of the background image content from the perspective of the image sensor to an expected perspective of the user's second eye provided by the other light-transmissive viewing surface of the electronic system;

determine second filtered background image data at least in part by low pass filtering the second re-projected background image data;

determine a second perceived background brightness metric indicative of brightness level of the background image content expected to be perceived at the second pixel position on the other display panel based at least in part on the second filtered background image data corresponding with the second pixel position on the other display panel and the ambient lighting metric output from the ambient light sensor;

determine a second target tone mapping to be applied to the second input augmented reality image data based at least in part on the second perceived background brightness metric associated with the second input augmented reality image data; and determine other display augmented reality image data to be used by the other display panel to display the augmented reality image content at least in part by applying the second target tone mapping to the second input augmented reality image data.

13. The electronic system of claim 11, wherein the image processing circuitry is configured to:

determine a local tone map grid corresponding with the frame of augmented reality image content based at least in part on the first filtered background image data, wherein the local tone map grid comprises a plurality of grid zones that each groups together adjacent pixel positions associated with a same perceived background brightness metric;

determine a grid zone including the first pixel position corresponding with the first input augmented reality image data; and determine the first perceived background brightness metric indicative of the brightness level of the background image content expected to be perceived at the first pixel position as a perceived background brightness metric associated with the grid zone including the first pixel position.

14. The electronic system of claim 11, wherein the image processing circuitry is configured to:

determine a second perceived background brightness metric indicative of brightness level of the background image content expected to be perceived at a second pixel position adjacent the first pixel position on the display panel based at least in part on the first filtered background image data corresponding with the second pixel position and the ambient lighting metric output from the ambient light sensor;

identify the first pixel position and the second pixel position as being included in a first grid zone of a local tone map grid associated with the frame of augmented reality image content when the first perceived background brightness metric associated with the first pixel position matches the second perceived background brightness metric associated with the second pixel position, wherein each pixel position included in the first grid zone of the local tone map grid is associated with the first target tone mapping; and identify the second pixel position as being included in a second grid zone different from the first grid zone of the local tone map when the second perceived background brightness metric associated with the second pixel position does not match the first perceived background brightness metric associated with the first pixel position, wherein each pixel position included in the second grid zone of the local tone map grid is associated with a second target tone mapping different from the first target tone mapping.

15. A method of operating an electronic system comprising:

receiving, using processing circuitry implemented in the electronic system, first augmented reality input image data corresponding with a first frame of augmented reality image content to be displayed on a display panel such that the first frame of augmented reality image content is perceived as being overlaid on background image content viewed through a light transmissive viewing surface of the electronic system;

receiving, using the processing circuitry, first captured background image data output from an image sensor, wherein the first captured background image data corresponds with a first captured frame of the background image content over which the first frame of augmented reality image content is expected to be overlaid;

determining, using the processing circuitry, first re-projected background image data at least in part by processing the first captured background image data to re-project the first captured frame of the background image content from a perspective of the image sensor to an expected viewing perspective provided by the light transmissive viewing surface of the electronic system;

determining, using the processing circuitry, first filtered background image data at least in part by processing the first re-projected background image data to low pass filter the first re-projected background image data;

determining, using the processing circuitry, a first local tone map grid corresponding with the first frame of augmented reality image content based at least in part on the first filtered background image data, wherein the first local tone map grid comprises a first plurality of grid zones that are each associated with a different target local tone mapping; and determining, using the processing circuitry, first display augmented reality image data to be output to the display panel to enable the display panel to display the first frame of augmented reality image content at least in part by tone mapping the first augmented reality input image data in accordance with the first local tone map grid.

16. The method of claim 15, comprising, receiving, an ambient lighting metric output from an ambient light sensor, wherein determining the first display augmented reality image data comprises:

determining a perceived background brightness metric indicative of brightness level of the background image content expected to be perceived at a pixel position on the display panel during display of the first frame of augmented reality image content based at least in part on the first filtered background image data corresponding with the pixel position and the ambient lighting metric;

determining a previous augmented reality content histogram indicative of augmented reality image content brightness level of a previous frame of augmented reality image content;

determining a target tone mapping to be applied to the first augmented reality input image data corresponding with the pixel position on the display panel based at least in part on the perceived background brightness metric associated with the pixel position and the previous augmented reality content histogram; and determining the first display augmented reality image data corresponding with the pixel position on the display panel at least in part by applying the target tone mapping to the first augmented reality input image data corresponding with the pixel position on the display panel.

17. The method of claim 15, comprising:

receiving, using the processing circuitry implemented in the electronic system, second augmented reality input image data corresponding with a second frame of augmented reality image content to be displayed on the display panel such that the second frame of augmented reality image content is perceived as being overlaid on the background image content viewed through the light transmissive viewing surface of the electronic system;

receiving, using the processing circuitry, second captured background image data output from the image sensor, wherein the second captured background image data corresponds with a second captured frame of the background image content over which the second frame of augmented reality image content is expected to be overlaid;

determining, using the processing circuitry, second re-projected background image data at least in part by processing the second captured background image data to re-project the second captured frame of the background image content from the perspective of the image sensor to the expected viewing perspective provided by the light transmissive viewing surface of the electronic system; and determining, using the processing circuitry, second filtered background image data at least in part by processing the second re-projected background image data to low pass filter the second re-projected background image data;

determining, using the processing circuitry, a second local tone map grid corresponding with the second frame of augmented reality image content based at least in part on the second filtered background image data, wherein the second local tone map grid comprises a second plurality of grid zones and is different from the first local tone map grid corresponding with the first frame of augmented reality image content;

determining, using the processing circuitry, second display augmented reality image data to be output to the display panel to enable the display panel to display the second frame of augmented reality image content at least in part by tone mapping the second augmented reality input image data in accordance with the second local tone map grid.

18. The method of claim 15, wherein determining the first local tone map grid comprises:

determining a first perceived background brightness metric indicative of brightness level of the background image content expected to be perceived at a first pixel position on the display panel during display of the first frame of augmented reality image content based at least in part on the first filtered background image data corresponding with the first pixel position;

determining a second perceived background brightness metric indicative of brightness level of the background image content expected to be perceived at a second pixel position adjacent the first pixel position on the display panel during display of the first frame of augmented reality image content based at least in part on the first filtered background image data corresponding with the second pixel position;

identifying the first pixel position and the second pixel position as being included in a first grid zone of the first local tone map grid when the first perceived background brightness metric associated with the first pixel position matches the second perceived background brightness metric associated with the second pixel position, wherein each pixel position included in the first grid zone is associated with a first target tone mapping; and identifying the second pixel position as being included in a second grid zone different from the first grid zone of the first local tone map grid when the second perceived background brightness metric associated with the second pixel position does not match the first perceived background brightness metric associated with the first pixel position, wherein each pixel position included in the second grid zone is associated with a second target tone mapping.

19. Image processing circuitry configured to be deployed in an electronic system to process augmented reality image data before corresponding augmented reality image content is displayed on a display panel of the electronic system, wherein the image processing circuitry comprises:

background re-projection circuitry configured to:
  receive captured background image data corresponding with a captured frame of background image content over which the augmented reality image content is expected to be displayed;
  determine re-projected background image data at least in part by processing the captured background image data to re-project the captured frame of background image content from an image sensor perspective to a viewing perspective provided by a light-transmissive viewing surface through which the background image content is expected to be viewed;

background filtering circuitry communicatively coupled to the background re-projection circuitry, wherein the background filtering circuitry is configured to determine filtered background image data at least in part by low pass filtering the re-projected background image data;

background analysis circuitry communicatively coupled to the background filtering circuitry, wherein the background analysis circuitry is configured to determine a perceived background brightness metric indicative of background brightness level expected at a pixel position on the display panel during display of the augmented reality image content based at least in part on the filtered background image data corresponding with the pixel position; and tone mapping circuitry communicatively coupled to the background filtering circuitry, wherein the tone mapping circuitry is configured to process the augmented reality image data at least in part by applying a tone mapping associated with the perceived background brightness metric to the augmented reality image data corresponding with the pixel position.

* * * * *